US012705563B2

(12) United States Patent
Chintalapati et al.

(10) Patent No.: US 12,705,563 B2
(45) Date of Patent: Aug. 11, 2026

(54) SYSTEM AND METHOD FOR EXTENDING AND VALIDATING A SEMANTIC MODEL FOR USE WITH AN ANALYTIC APPLICATIONS ENVIRONMENT

(71) Applicant: Oracle International Corporation, Redwood Shores, CA (US)

(72) Inventors: Renu Chintalapati, San Ramon, CA (US); Akshay Satyendranath, Sunnyvale, CA (US); Pradeep Shekhar Katta, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 304 days.

(21) Appl. No.: 17/395,819

(22) Filed: Aug. 6, 2021

(65) Prior Publication Data

US 2022/0129798 A1 Apr. 28, 2022

Related U.S. Application Data

(60) Provisional application No. 63/105,108, filed on Oct. 23, 2020.

(51) Int. Cl.

| | |
|---|---|
| ***G06F 16/28*** | (2019.01) |
| ***G06F 16/26*** | (2019.01) |
| ***G06Q 10/067*** | (2023.01) |

(52) U.S. Cl.

CPC ......... *G06Q 10/067* (2013.01); *G06F 16/283* (2019.01); *G06F 16/26* (2019.01)

(58) Field of Classification Search

None

See application file for complete search history.

(56) References Cited

U.S. PATENT DOCUMENTS

| | | | | |
|---|---|---|---|---|
| 11,620,541 | B1 * | 4/2023 | Ghosh | G06N 20/00 707/600 |
| 2009/0037237 | A1 * | 2/2009 | Weber | G06Q 10/067 705/7.11 |

(Continued)

OTHER PUBLICATIONS

Rao, Padma, "Oracle© Cloud Administering Oracle Fusion Analytics Warehouse" F15093-30, May 2021, Copyright ® 2019, 2021, 120 pages.

*Primary Examiner* — Dawaune A Conyers

(74) *Attorney, Agent, or Firm* — TUCKER ELLIS LLP

(57) ABSTRACT

In accordance with an embodiment, described herein is a system and method for extending a semantic model, for use with an analytic applications, analytics cloud, or other type of business intelligence or data analytics environment. A semantic model extension process introspects a customer's data, for example as stored in a data warehouse instance, and evaluates metadata associated therewith to determine custom facts, custom dimensions, and/or other types of data source model extensions. A payload or indication of such extensions is used to extend or customize a semantic model that enables surfacing of business intelligence or data analytics at a presentation layer. In accordance with an embodiment, the system can include an administrative console application and user interface that allows a user to view and validate a customer's data as loaded from their source environment into a data warehouse instance for use with other types of data analytics environments.

20 Claims, 26 Drawing Sheets

(56) References Cited

U.S. PATENT DOCUMENTS

| | | | | |
|---|---|---|---|---|
| 2011/0283260 | A1* | 11/2011 | Bucuvalas | G06F 11/3664<br>717/124 |
| 2012/0259892 | A1* | 10/2012 | Kottu | G06F 16/9535<br>707/E17.005 |
| 2013/0031129 | A1* | 1/2013 | Jang | G06F 16/958<br>707/769 |
| 2013/0110765 | A1* | 5/2013 | Heidasch | G06F 16/00<br>707/601 |
| 2016/0092499 | A1* | 3/2016 | Leigh | G06F 8/34<br>707/740 |
| 2017/0177882 | A1* | 6/2017 | Allgaier | G06F 21/604 |
| 2020/0004848 | A1* | 1/2020 | Wood | G06N 5/022 |

* cited by examiner

SYSTEM AND METHOD FOR EXTENDING AND VALIDATING A SEMANTIC MODEL FOR USE WITH AN ANALYTIC APPLICATIONS ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application titled "SYSTEM AND METHOD FOR EXTENDING A SEMANTIC MODEL FOR USE WITH AN ANALYTIC APPLICATIONS ENVIRONMENT", Application No. 63/105,108, filed Oct. 23, 2020; which application is herein incorporated by reference.

TECHNICAL FIELD

Embodiments described herein are generally related to data analytics, and are particularly related to systems and methods for extending and validating a semantic model, for use with an analytic applications, data analytics, or business intelligence environments.

BACKGROUND

Generally described, data analytics enables computer-based examination or analysis of large amounts of data, in order to derive conclusions or other information from that data; while business intelligence tools provide business users with information describing enterprise data in a format that enables those users to make strategic business decisions.

Increasingly, there is an interest in developing software applications that leverage the use of data analytics within the context of enterprise software application or data environments, such as, for example, an Oracle Fusion Applications environment; or within the context of a software-as-a-service (SaaS) or cloud environment, such as, for example, an Oracle Analytics Cloud environment.

However, different enterprise customers may have particular requirements with regard to how their data should be classified, aggregated, or transformed, for purposes of providing key performance indicators, data analytics, or other types of business intelligence data. For example, a customer may elect to modify the data source model associated with their data. However, typically such customizations must then be manually applied to a semantic model, so that they can be used by the system in providing business intelligence data.

SUMMARY

In accordance with an embodiment, described herein is a system and method for extending a semantic model, for use with an analytic applications, analytics cloud, or other type of business intelligence or data analytics environment. A semantic model extension process introspects a customer's data, for example as stored in a data warehouse instance, and evaluates metadata associated therewith to determine custom facts, custom dimensions, and/or other types of data source model extensions. A payload or indication of such extensions is used to extend or customize a semantic model that enables surfacing of business intelligence or data analytics at a presentation layer. In accordance with an embodiment, the system can include an administrative console application and user interface that allows a user to view and validate a customer's data as loaded from their source environment into a data warehouse instance for use with other types of data analytics environments.

DETAILED DESCRIPTION

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

Analytic Applications Environments

In accordance with an embodiment, an analytic applications environment, for example an Oracle Fusion Analytics Warehouse (FAW) environment, or NetSuite Analytics Warehouse (NAW) environment, enables data analytics within the context of an organization's enterprise software application or data environment, or a software-as-a-service or other type of cloud environment; and supports the development of computer-executable software analytic applications or providing of data analytics or business intelligence.

Figure 1:
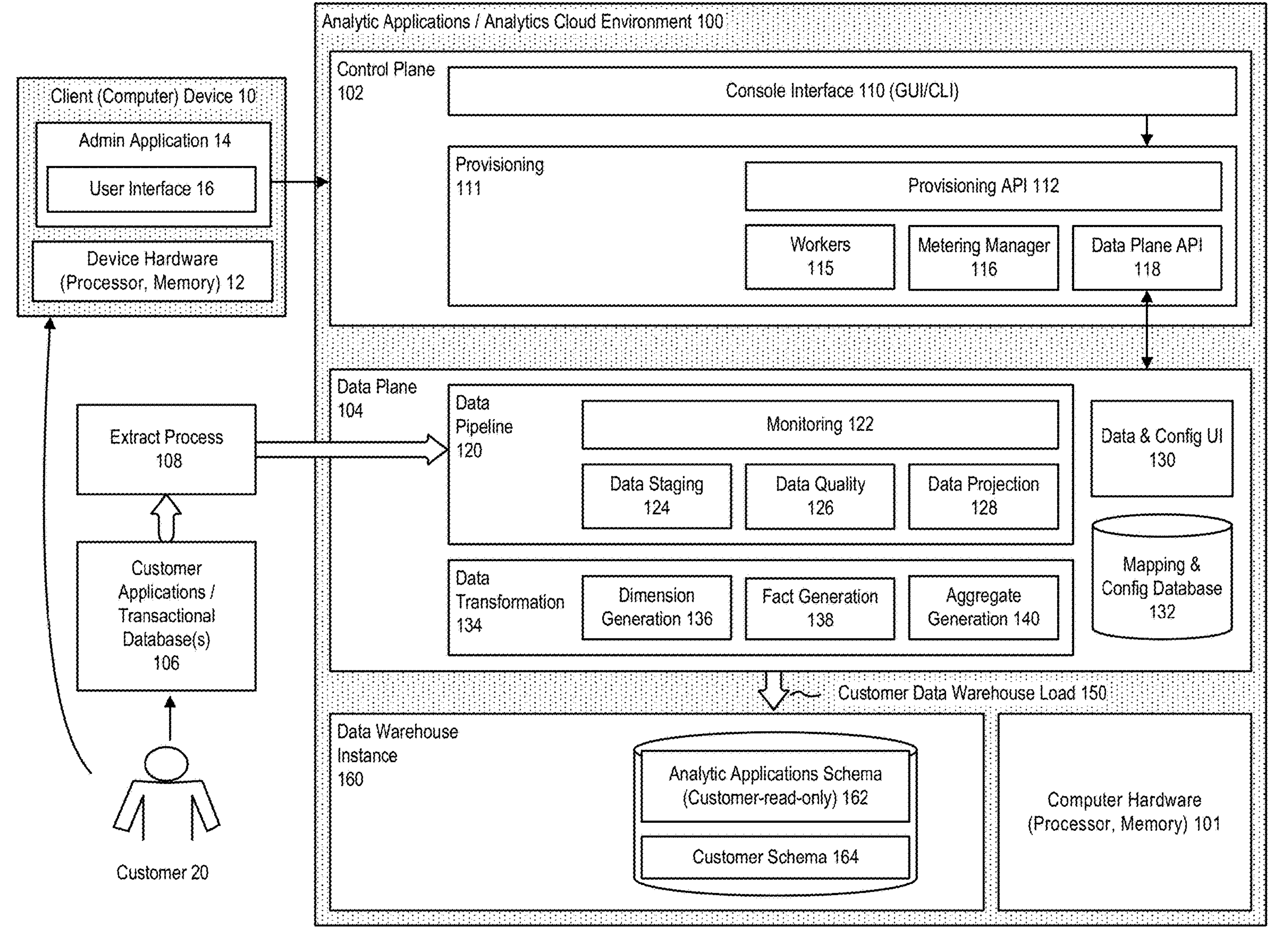
FIG. 1 illustrates a system for providing an analytic applications environment, in accordance with an embodiment.

FIG. 1 illustrates a system for providing an analytic applications environment, in accordance with an embodiment.

The example shown and described in FIG. 1 is provided for purposes of illustrating an example of one type of data analytics environment that can utilize the various embodiments of providing extensibility as described herein. In accordance with other embodiments and examples, the extensibility features described herein can be used with other types of data analytics environments.

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, In accordance with an embodiment, the analytic applications environment allows customers (tenants) to develop computer-executable software analytic applications for use with a BI component, such as, for example, an Oracle Business Intelligence Applications (OBIA) environment, Oracle Transactional Business Intelligence (OTBI) environment, or other type of BI component adapted to examine large amounts of data sourced either by the customer (tenant) itself, or from multiple third-party entities.

As illustrated in FIG. 1, in accordance with an embodiment, an analytic applications environment or analytics cloud (e.g., OAC) 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment. For example, in accordance with an embodiment, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, the provisioning component can include various functionality to provision services that are specified by provisioning commands. For example, in accordance with an embodiment, the provisioning component can be accessed and utilized, via the console interface, by a customer (tenant) to purchase one or more of a suite of business productivity software applications, together with a data warehouse instance for use with those software applications.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic basis.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Figure 2:
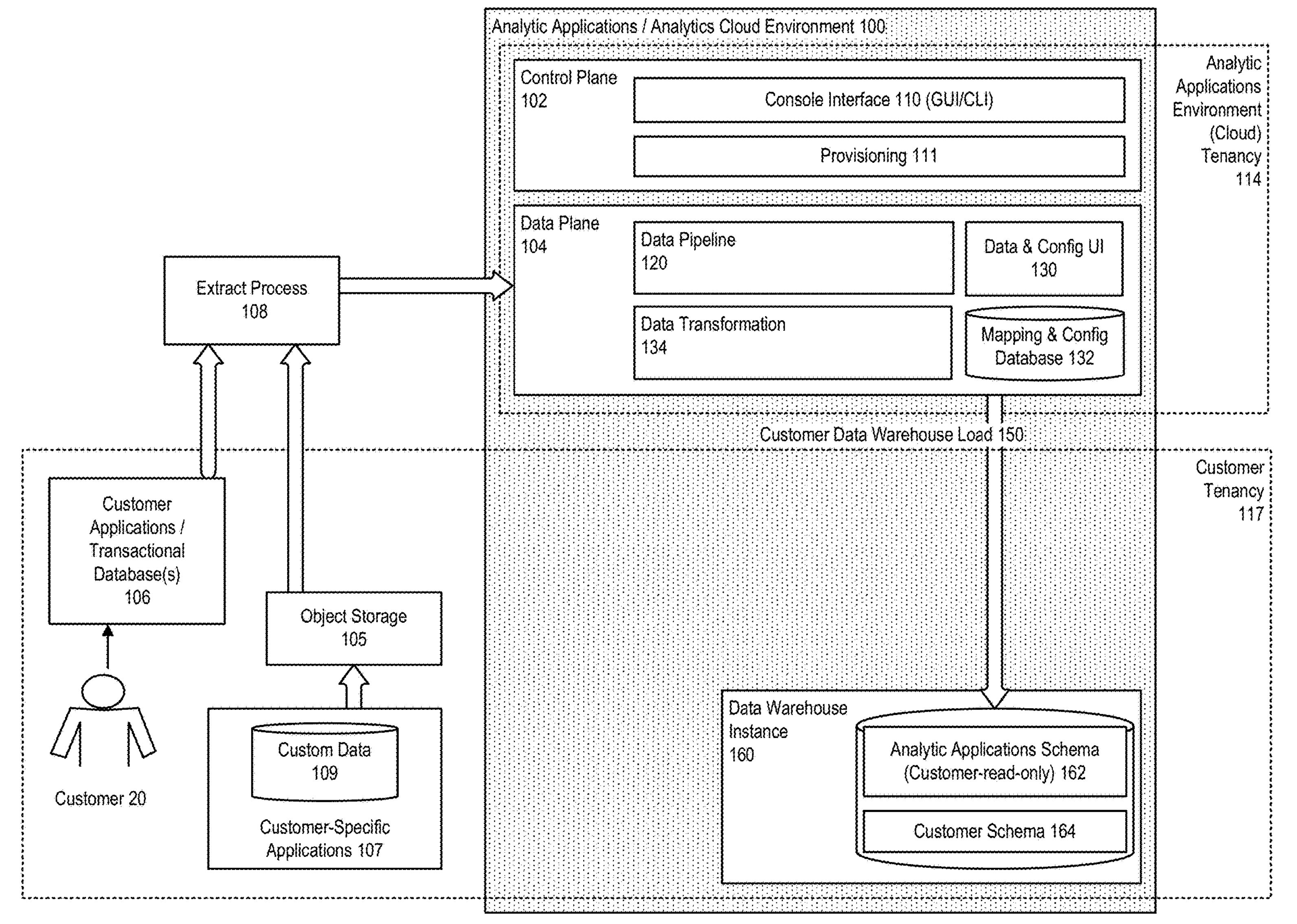
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., ADW, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 3:
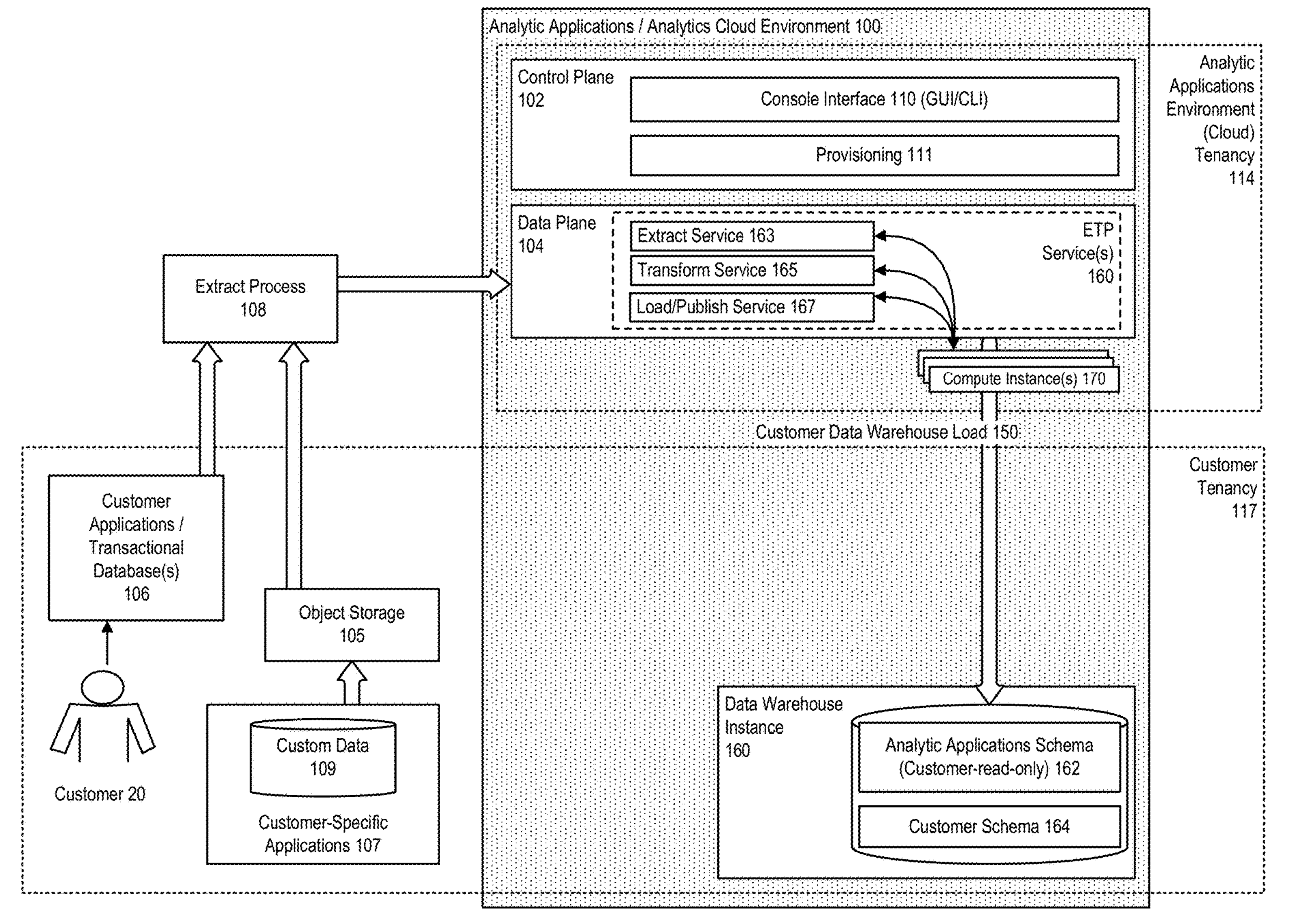
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI Cloud Connector (BICC) component via a ReST call. The extracted files can be uploaded to an object storage component, such as, for example, an Oracle Storage Service (OSS) component, for storage of the data.

Transformation: In accordance with an embodiment, the transformation process takes the data files from object storage component (e.g., OSS), and applies a business logic while loading them to a target data warehouse, e.g., an ADWC database, which is internal to the data pipeline or process, and is not exposed to the customer (tenant).

Load/Publish: In accordance with an embodiment, a load/publish service or process takes the data from the, e.g., ADWC database or warehouse, and publishes it to a data warehouse instance that is accessible to the customer (tenant).

Figure 4:
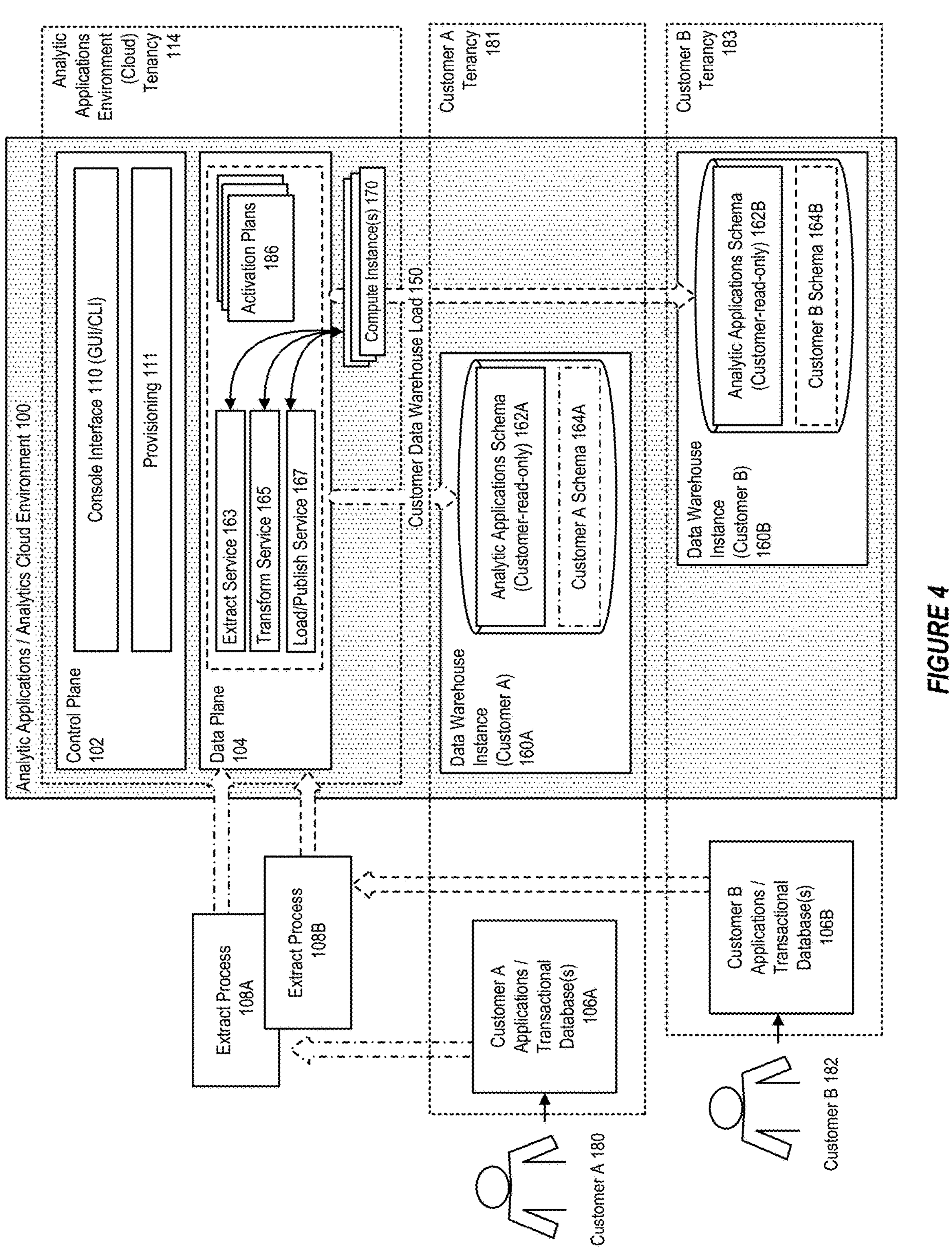
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic basis, by the system in accordance with best practices for a particular analytics use case.

In accordance with an embodiment, for each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Semantic Model Extension

Different enterprise customers may have particular requirements with regard to how their data should be classified, aggregated, or transformed, for purposes of providing key performance indicators, data analytics, or other types of business intelligence data. For example, a customer may elect to modify the data source model associated with their data, for example by adding custom facts or dimensions.

In accordance with an embodiment, the system provides a method for extending a semantic model, for use with an analytic applications, analytics cloud, or other type of business intelligence or data analytics environment.

A semantic model extension process introspects a customer's data, for example as stored in a data warehouse instance, and evaluates metadata associated therewith to determine custom facts, custom dimensions, and/or other types of model extensions associated with the source data.

A payload or indication of such extensions is used to extend or customize a semantic model that enables surfacing of business intelligence or data analytics at a presentation layer.

Figure 5:
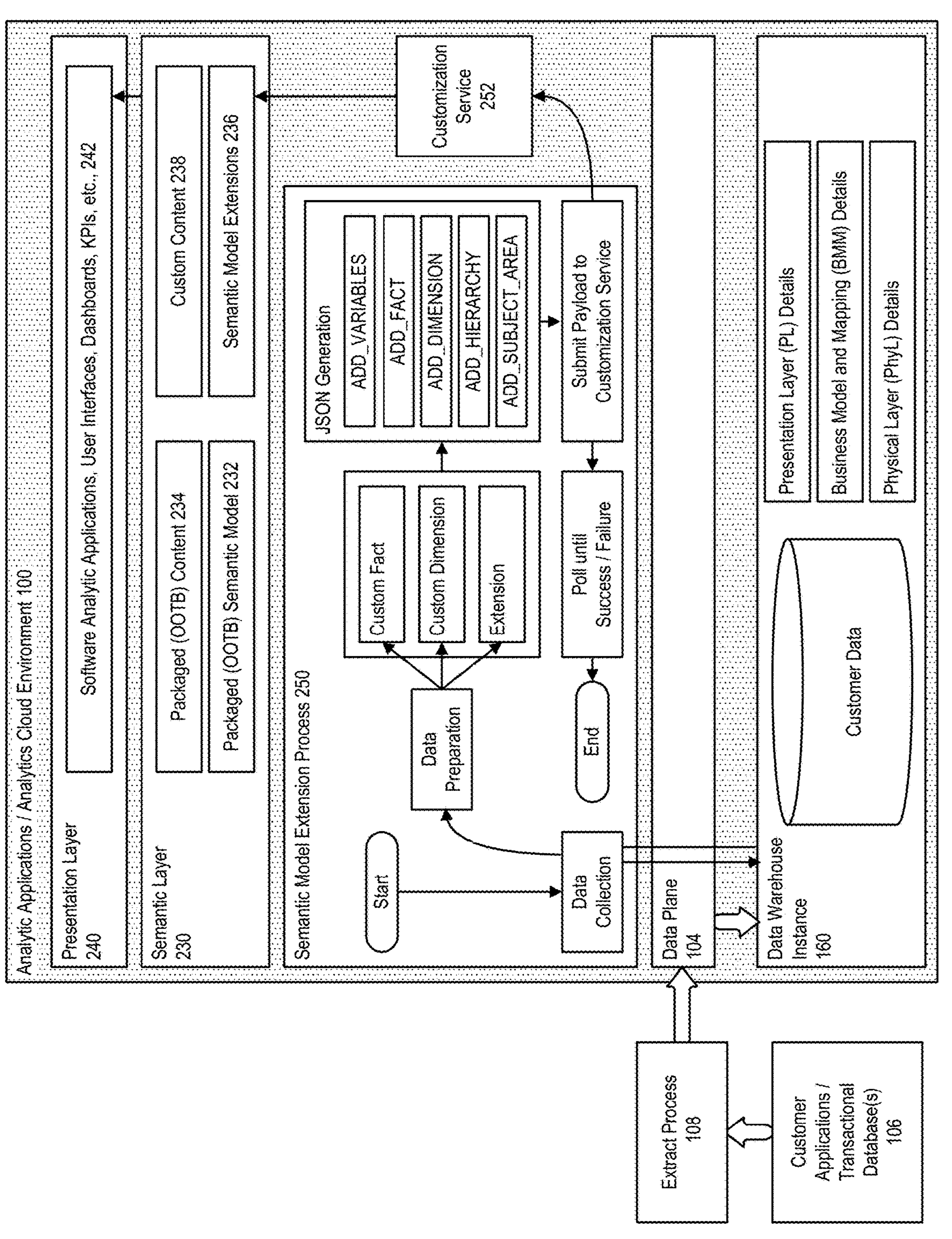
FIG. 5 illustrates a system and process for extending a semantic model, in accordance with an embodiment.

FIG. 5 illustrates a system and process for extending a semantic model, in accordance with an embodiment.

As illustrated in FIG. 5, in accordance with an embodiment, the system can provide a semantic layer 230 that includes or operates with:

A physical layer (PhyL) having associated details or metadata that maps to a physical data model;

A business model and mapping (BMM) layer having associated details or metadata that operates as a logical mapping of the data; and A presentation layer (PL) 240 having associated details or metadata that enables access to the data content, for example as KPIs 242, as may be provided by products such as, for example, Oracle Analytics Cloud, or Oracle Analytics for Applications (OAX).

In accordance with an embodiment, a packaged or out-of-the-box (OOTB) semantic model 232 can be used to provide a packaged content 234. For example, data can be loaded from a customer's enterprise software application or data environment, into a data warehouse instance, and the out-of-the-box semantic model can then be used to surface packaged content from the customer's source data to the presentation layer.

In accordance with an embodiment, to support different customer requirements, the semantic layer can be associated with semantic extensions 236 that extend the out-of-the-box semantic model, and can be used to provide custom content 238 to the presentation layer.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

For example, in accordance with an embodiment as described herein, the system can use a semantic model extension process to programmatically introspect a customer's data and determine custom facts, custom dimensions, or other customizations or extensions that have been made to the data source model, and then use an appropriate process or workflow to automatically modify or extend the semantic model to support those customizations or extensions.

As illustrated in FIG. 5, in accordance with an embodiment, the semantic model extension process 250 includes data collection and data preparation components, and is adapted to introspect a customer's source data at a data warehouse instance (e.g., as provided by ADW, ADWC), to determine, based upon presentation layer, business model and mapping, and physical layer details or metadata, one or more custom facts, custom dimensions, or extensions, associated with the customer's data.

In accordance with an embodiment, the semantic model extension process can generate and/or output a corresponding payload, for example as a JSON information, describing the customizations or extensions to the customer's data source model. The generated payload can be provided to a customization service 252 (referred to herein in some embodiments as an extension service), or other component or process adapted to receive an indication of custom facts, custom dimensions, or other customizations or extensions associated with a data source model, and update a semantic model accordingly, for example in an Oracle environment by modifying the RPD file associated with the semantic model.

In contrast to methods of extending a semantic model that may require extensive manual customer/user input, the described approach operates programmatically, so that the customer/user does not need to configure the extensions manually.

In accordance with an embodiment, the JSON information or payload generated by the semantic model extension process is used by the customization service (extension service) to perform corresponding operations upon the definition of the semantic model (e.g., RPD file), to update the semantic model to support the appropriate customer extensions.

The various types of extensions and operations supported by the semantic model extension process can be generally categorized as:

Custom Facts: In accordance with an embodiment, the semantic model extension process is adapted to determine a new/custom fact as a new fact table, comprising measurements or metrics that can be joined to an existing/custom dimension (dim).

Custom Dimensions: In accordance with an embodiment, the semantic model extension process is adapted to determine a new/custom dimension with attributes that can join to an existing/custom fact.

Extensions: In accordance with an embodiment, the semantic model extension process is adapted to determine a new/augmentation table as one that can be modeled as an extension to an existing dimension/fact.

Bridge Extensions: In accordance with an embodiment, the semantic model extension process is adapted to determine a bridge extension as a special case of an extension that can join a packaged or out-of-the-box fact to a custom dimension.

Prerequisites to Model Extension

In accordance with an embodiment, operation of the semantic model extension process requires, as prerequisites, accessing the details or metadata for each of the various layers in the semantic model (e.g., RPD file)—including the presentation layer, business model and mapping, and physical layer details or metadata as described above.

In accordance with an embodiment, such metadata can be read during input or receipt of a customer's source data from their data warehouse instance, and is generally refreshed each time a customer instance is patched. Examples of the types of details or metadata that can be received include:

Physical Layer (PhyL) details: In accordance with an embodiment, physical layer details or metadata can include table aliases and primary keys (e.g., aliasTblDetails); and dimension aliases for joining to new facts (e.g., dimAliasesForFactJoin).

Business Model and Mapping (BMM) details: In accordance with an embodiment, business model and mapping details or metadata can include a mapping from physical aliases to logical tables and logical table sources (LTS; e.g., logicalTblDetails); and default hierarchy levels for existing dimensions (e.g., dim HierDetails).

Presentation Layer (PL) details: In accordance with an embodiment, presentation layer details or metadata can include logical table to subject area (SA) mapping.

Data Pre-Processing

In accordance with an embodiment, during a data pre-processing phase, the semantic model extension process determines information such as, for example, tables that are being added, or columns that are being added, or joins, within the customer's data.

For example, when a customer defines an extension for use with their customer data, as stored in their data warehouse instance, they can specify a subject area (SA) where that particular data should be presented. The semantic model extension process can capture that information from the details or metadata associated with the customer's data warehouse instance and their data, to determine the specified subject areas.

In accordance with an embodiment, data pre-processing includes the additional phases of data collection, and data preparation, as further described below.

Data Collection

Some database operations are computationally expensive, such as, for example, connecting from a Fusion Analytics Warehouse/NetSuite Analytics Warehouse (FAW/NAW) tenancy to a customer's ADW instance.

To address this, in accordance with an embodiment, during data collection the semantic model extension process can be adapted to fetch much or all of the required information at the same time, including for example:

(1) The packaged or out-of-the-box semantic model metadata;

(2) Column information, including details such as datatype, precision, or attributes/measures;

(3) Join information, of various types including for example, out-of-the-box joins (e.g., OOTBJoins) or extensions joining to an out-of-the-box dimension/fact; custom facts joining to an out-of-the-box dimension; custom dimension/fact joins (e.g., customDimFactJoins) between a custom dimension and custom fact; bridge joins (e.g., bridgeJoins) or extensions joining to custom dimension; and (4) Subject area selections provided by the user (e.g., customSAMap).

Data Preparation

In accordance with an embodiment, the semantic model extension process is adapted to sort or order customizations or extensions to the data source model, for example so that custom facts are processed first—which enables the system to update a logical table details (logicalTblDetails) mapping with the custom fact details, and which is used while processing customDimFactJoins during the custom dimension workflow.

In accordance with an embodiment, each of the different types of customizations or extensions to the semantic model can be associated with a particular processing workflow, and ordering of the customizations/flows can be controlled by the workflow with regard to, for example, custom facts, custom dimensions, and/or joins between those custom facts and custom dimensions.

For example, in accordance with an embodiment, ordering of the customizations or extensions to the semantic model can be based on how the semantic model (e.g., RPD file) must be prepared.

In accordance with an embodiment, the output of the semantic model extension process, for example, JSON information or payload describing customizations or extensions to the data source model, encompasses the plurality of customizations or extensions to be made to the semantic model, for a particular customer.

In accordance with an embodiment, the Examples 1-3 described below illustrate how various portions of a JSON information or payload which can be generated by the semantic model extension process customer, based on introspection of the customer's data, can thereafter be used, for example, to add a custom fact and custom dimension to the semantic model, which can then be provided as a subject area for use by the customer.

```
"type": "ADD_FACT",
  "identifier": "add_fact_step",
  "payload": {
    "physical": {
      "database": {
        "name": "Oracle_Data_Warehouse",
        "schemas": [
          {
            "name": "OAX$OAC",
            "tables": [
              {
                "name": "DW_NS_X_SALES_ORDER_CUSTOMFACT_CUSTOMRECORD",
                "columns": [
                  {
                    "name": "CUSTRECORDOAX_CUST_REC_MEASURE",
                    "precision": 8,
                    "nullable": true
                  },
                  {
                    "name": "CUSTRECORDOAX_CUST_REC_ACCT_DIM",
                    "dataType": "DOUBLE",
                    "precision": 8,
                    "nullable": true
                  },
                ]},
              {
                "name": "Fact_DW_NS_X_SALES_ORDER_CUSTOMFACT_CUSTOMRECORD",
                "aliasOf": "DW_NS_X_SALES_ORDER_CUSTOMFACT_CUSTOMRECORD",
                "keys": [
                  {
```

-continued

```
                        "name": "Fact_DW_NS_X_SALES_ORDER_CUSTOMFACT_CUSTOMRECORD_Key",
                        "columns": [
                          "ID"
                        ]}
                    ],
                    "joins": [
                      {
                        "source": {
                          "refTable": "_SELF_",
                          "foreignKey": {
                            "name": "FK_Dim_DW_NS_ACCOUNT_D_112106142163610",
                            "columns": [
                              "CUSTRECORDOAX_CUST_REC_ACCT_DIM"
                            ]}
                        },
                        "target": {
                          "refTable": "\"Oracle_Data_Warehouse\"..\"OAX$OAC\".\"Dim_DW_NS_ACCOUNT_D\"",
                          "key": "PK"
                        }},
                      {
                        "source": {
                          "refTable": "_SELF_",
                          "foreignKey": {
                            "name": "FK_Dim_DW_NS_EXPENSEACC_112106143257238",
                            "columns": [
                              "CUSTRECORDOAX_CUST_REC_ACCT_DIM"
                            ]}
                        },
                        "target": {
                          "refTable":
"\"Oracle_Data_Warehouse\"..\"OAX$OAC\".\"Dim_DW_NS_EXPENSEACCOUNT_D\"",
                          "key": "PK"
                        }}]}]}]}
        },
        "logical": {
          "businessModel": {
            "name": "Core",
            "tables": [
              {
                "name": "Fact - Custom_DW_NS_X_SALES_ORDER_CUSTOMFACT_CUSTOMRECORD",
                "columns": [
                  {
                    "name": "CUSTRECORDOAX_CUST_REC_MEASURE",
                    "aggregations": [
                      {
                        "formula":                    "SUM(\"Core\".\"Fact                                -
Custom_DW_NS_X_SALES_ORDER_CUSTOMFACT_CUSTOMRECORD\".\"CUSTRECORDOAX_CUST_REC
_MEASURE\")"
                      }]}
                ],
                "logicalTableSources": [
                  {
                    "name": "Fact_DW_NS_X_SALES_ORDER_CUSTOMFACT_CUSTOMRECORD",
                    "refMapsToTables": [
"\"Oracle_Data_Warehouse\"..\"OAX$OAC\".\"Fact_DW_NS_X_SALES_ORDER_CUSTOMFACT_CUSTOMREC
ORD\""
                    ],
                    "columnMappings": [
                      {
                        "logicalColumn": "CUSTRECORDOAX_CUST_REC_MEASURE",
                        "expr":
"\"Oracle_Data_Warehouse\".\"\".\"OAX$OAC\".\"Fact_DW_NS_X_SALES_ORDER_CUSTOMFACT_CUSTOMR
ECORD\".\"CUSTRECORDOAX_CUST_REC_MEASURE\""
                      }
                    ],
                    "groupBy":   "GROUPBYLEVEL(\"Core\".\"NetSuite   Expense   Account\".\"Detail\",\"Core\".\"NetSuite
Account\".\"Detail\")"
                  }]}
            ],
            "complexJoins": [
              {
                "name": "Relationship_112106144374762",
                "refSourceTable": "\"Core\".\"Dim - NetSuite Expense Account\"",
                "refTargetTable":                          "\"Core\".\"Fact                                -
Custom_DW_NS_X_SALES_ORDER_CUSTOMFACT_CUSTOMRECORD\"",
                "type": "INNER",
                "cardinality": "ONE_TO_MANY"
              },
              {
```

-continued

"name": "Relationship_112106144406182",
"refSourceTable": "\"Core\".\"Dim - NetSuite Account\"",
"refTargetTable": "\"Core\".\"Fact -
Custom_DW_NS_X_SALES_ORDER_CUSTOMFACT_CUSTOMRECORD\"",
"type": "INNER",
"cardinality": "ONE_TO_MANY"
}]}}}
}, Example 1

For example, as illustrated in Example 1, in accordance with an embodiment, the semantic model extension process can generate a JSON information or payload to add a custom fact to the semantic model, based on introspection of the customer's data, including generally:

In the physical layer: Importing source tables from the customer's data source model into the physical layer; creating aliases for the tables where appropriate (which may be required in some environments); performing joins in the physical layer between table facts and dimensions, to create target tables in the physical layer; wherein the custom fact is imported into the logical layer.

In the business mapping and model layer: Creating measures or attributes in the logical layer, including where appropriate applying aggregations or other formulae; creating a logical table source (LTS) to which columns can be mapped; and performing joins in the business mapping and model layer between the logical facts and the logical dimensions; wherein the custom fact can then be made available to the presentation layer.

In the presentation layer: Exposing the custom fact, for example within a subject area as a displayed name, in accordance with the customer requirements.

"type": "ADD_DIMENSION",
"identifier": "add_degen_dim_step",
"payload": {
"logical": {
"businessModel": {
"name": "Core",
"tables": [
{
"name": "Dim - Custom_DW_NS_X_SALES_ORDER_CUSTOMFACT_CUSTOMRECORD",
"columns": [
{
"name": "CUSTRECORDOAX_CUST_REC_FREE_TXT"
},
{
"name": "ID"
}],
"keys": [
{
"name": "Fact_DW_NS_X_SALES_ORDER_CUSTOMFACT_CUSTOMRECORD_Key",
"columns": [
"ID"
]}],
"logicalTableSources": [
{
"name": "Fact_DW_NS_X_SALES_ORDER_CUSTOMFACT_CUSTOMRECORD",
"refMapsToTables": [
"\"Oracle_Data_Warehouse\"..\"OAX$OAC\".\"Fact_DW_NS_X_SALES_ORDER_CUSTOMFACT_CUSTOMREC
ORD\""
],
"columnMappings": [
{
"logicalColumn": "CUSTRECORDOAX_CUST_REC_FREE_TXT",
"expr":
"\"Oracle_Data_Warehouse\".\"\".\"OAX$OAC\".\"Fact_DW_NS_X_SALES_ORDER_CUSTOMFACT_CUSTOMR
ECORD\".\"CUSTRECORDOAX_CUST_REC_FREE_TXT\""
},
{
"logicalColumn": "ID",
"expr":
"\"Oracle_Data_Warehouse\".\"\".\"OAX$OAC\".\"Fact_DW_NS_X_SALES_ORDER_CUSTOMFACT_CUSTOMR
ECORD\".\"ID\""
}]}]}
],
"complexJoins": [
{
"name": "Relationship_112106149321957",
"refSourceTable": "\"Core\".\"Dim -
Custom_DW_NS_X_SALES_ORDER_CUSTOMFACT_CUSTOMRECORD\"",
"refTargetTable": "\"Core\".\"Fact -

-continued

```
Custom_DW_NS_X_SALES_ORDER_CUSTOMFACT_CUSTOMRECORD\"",
                    "type": "INNER",
                    "cardinality": "ONE_TO_MANY"
                  }]}}}
  },
```

Example 2

As illustrated in Example 2, in accordance with an embodiment, the semantic model extension process can thereafter proceed to generate a JSON information or payload to add a custom dimension to the semantic model, based on introspection of the customer's data.

```
  "type": "ADD_SUBJECT_AREA",
    "identifier": "add_subjectArea_step",
    "payload": {
      "presentation": {
        "catalogs": [
          {
            "name": "NetSuite - Sales Order",
            "tables": [
              {
                "name": "Custom_DW_NS_X_SALES_ORDER_CUSTOMFACT_CUSTOMRECORD",
                "translationKey": "Custom_DW_NS_X_SALES_ORDER_CUSTOMFACT_CUSTOMRECORD",
                "dispName":
"VALUEOF(NQ_SESSION.DW_NS_X_SALES_ORDER_CUSTOMFACT_CUSTOMRECORD)",
                "columns": [
                  {
                    "name": "CUSTRECORDOAX_CUST_REC_MEASURE",
                    "useLogicalColName": true,
                    "translationKey": "CUSTRECORDOAX_CUST_REC_MEASURE",
                    "dispName":
"VALUEOF(NQ_SESSION.DW_NS_X_SALES_ORDER_CUSTOMFACT_CUSTOMRECORD_CUSTRECORDO
AX_CUST_REC_MEASURE)",
                    "expr": "\"Core\".\"Fact -
Custom_DW_NS_X_SALES_ORDER_CUSTOMFACT_CUSTOMRECORD\".\"CUSTRECORDOAX_CUST_REC
_MEASURE\""
                  },
                  {
                    "name": "CUSTRECORDOAX_CUST_REC_FREE_TXT",
                    "useLogicalColName": true,
                    "translationKey": "CUSTRECORDOAX_CUST_REC_FREE_TXT",
                    "dispName":
"VALUEOF(NQ_SESSION.DW_NS_X_SALES_ORDER_CUSTOMFACT_CUSTOMRECORD_CUSTRECORDO
AX_CUST_REC_FREE_TXT)",
                    "expr": "\"Core\".\"Dim -
Custom_DW_NS_X_SALES_ORDER_CUSTOMFACT_CUSTOMRECORD\".\"CUSTRECORDOAX_CUST_REC
_FREE_TXT\""
                  },
                  {
                    "name": "ID",
                    "useLogicalColName": true,
                    "translationKey": "ID",
                    "dispName":
"VALUEOF(NQ_SESSION.DW_NS_X_SALES_ORDER_CUSTOMFACT_CUSTOMRECORD_ID)",
                    "expr": "\"Core\".\"Dim -
Custom_DW_NS_X_SALES_ORDER_CUSTOMFACT_CUSTOMRECORD\".\"ID\""
                  }]}]}]}}
}
```

Example 3

As illustrated in Example 3, in accordance with an embodiment, the semantic model extension process can thereafter proceed to generate a JSON information or payload to add a subject area to the semantic model, based on introspection of the customer's data.

The above examples of custom facts, custom dimensions, subject areas, and JSON information or payloads that can be generated and used to extend a semantic model, are provided in accordance with an embodiment, by way of example and for purposes of illustration; in accordance with other embodiments and examples, other types of customizations and extensions to a semantic model, and other types of information or payloads can be used.

Example Semantic Model Extensions

FIGS. 6-12 illustrate various examples of extending a semantic model, in accordance with an embodiment.

In accordance with an embodiment, an initial step is to import the source table and columns into the physical layer. Then, in accordance with an embodiment, for each type of customization or extension, for example, custom facts, custom dimensions, or other customizations or extensions to the data source model, the system can use an appropriate process or workflow to automatically modify or extend the semantic model to support that customization or extension, as further described in the examples below.

Custom Facts

Figure 6:
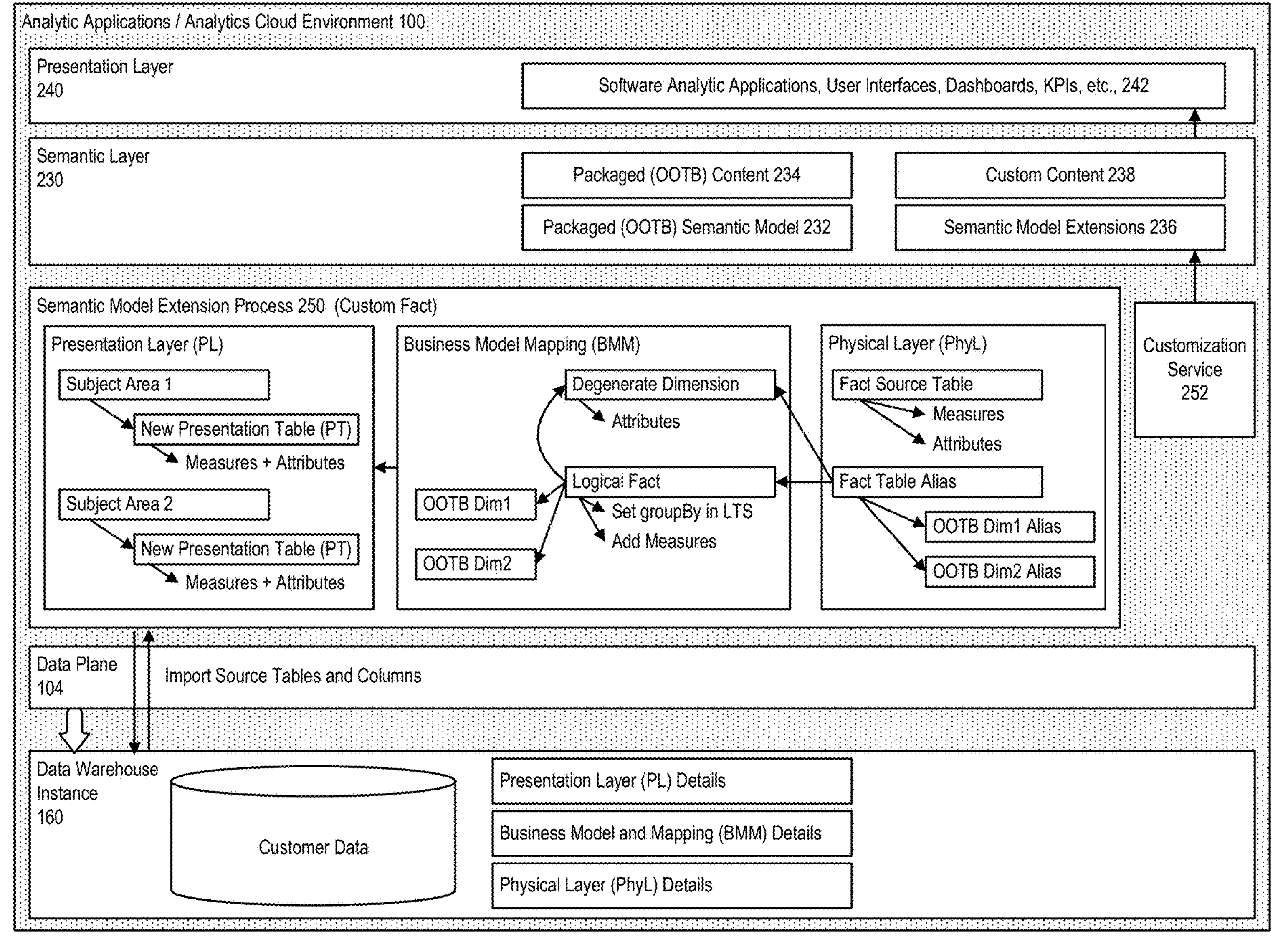
FIG. 6 illustrates an example of extending a semantic model, in accordance with an embodiment.

As illustrated in FIG. 6, in accordance with an embodiment, in order for the semantic model extension process to extend the semantic model to incorporate a custom fact, as determined by the introspected data, the workflow can be driven by joins (e.g., OOTBJoins) of the custom fact.

In accordance with an embodiment, one or more target alias (e.g., tgtAlias) of the out-of-the-box dimensions can be identified using a dimension alias for fact join (dimAliasesForFactJoin), and are joined to the fact table source alias (e.g., srcAlias). The source alias is then used to define a logical fact containing measures, and a dimension table containing the attributes. The out-of-the-box logical dimension are identified using a dimension hierarchy details (dimHierDetails) and are joined to the logical fact (e.g., LogicalFactQ). The columns are then added to a new presentation table (PT) in each user-selected or custom subject area map (customSAMap).

Figure 7:
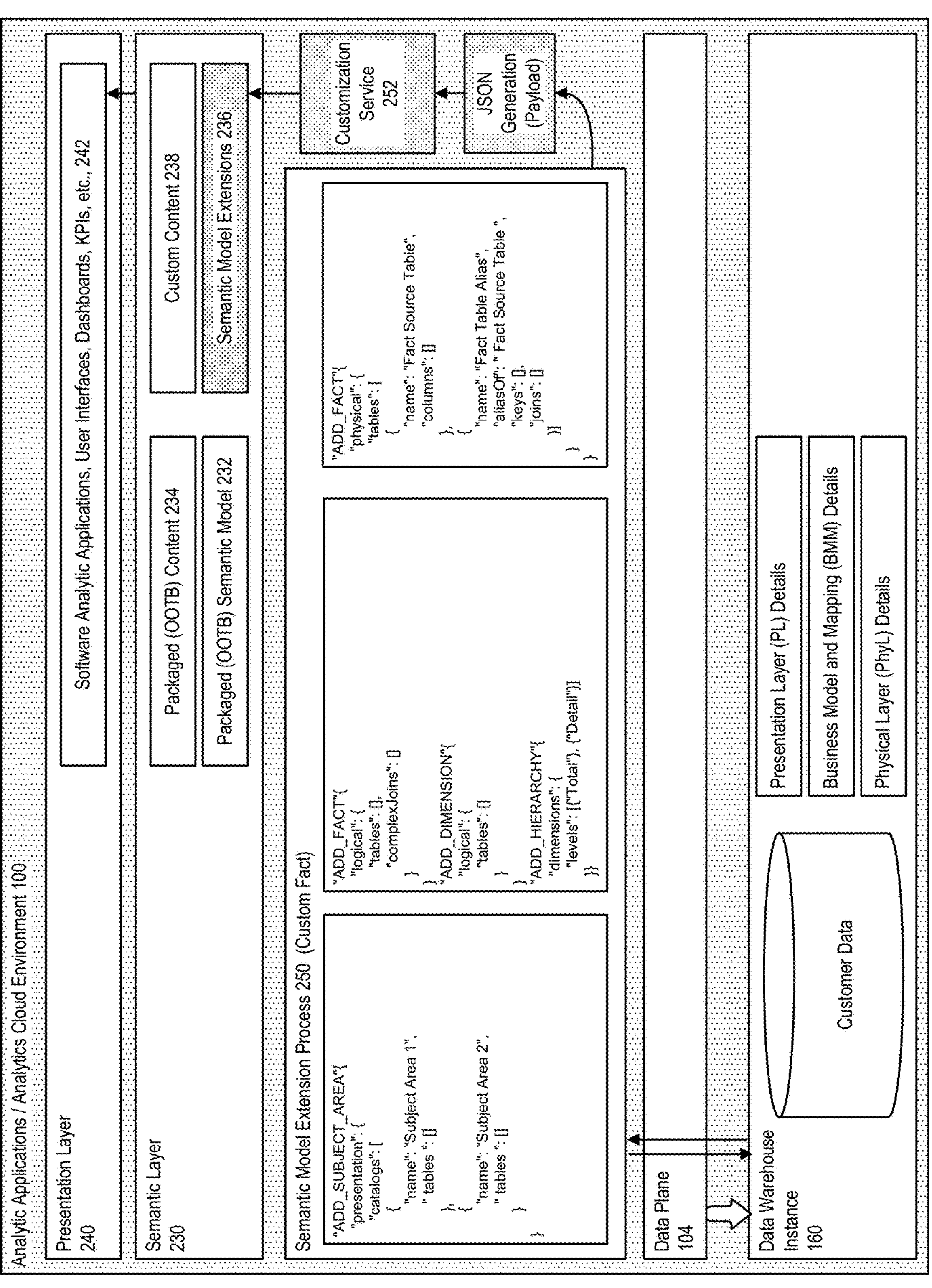
FIG. 7 further illustrates an example of extending a semantic model, in accordance with an embodiment.

By way of example to illustrate the above workflow, FIG. 7 illustrates an example JSON information or payload provided as an output by the semantic model extension process, which can then be provided to the customization service (extension service), and used to update or extend the semantic model to include the custom fact associated with the customer's data.

Custom Dimensions

Figure 8:
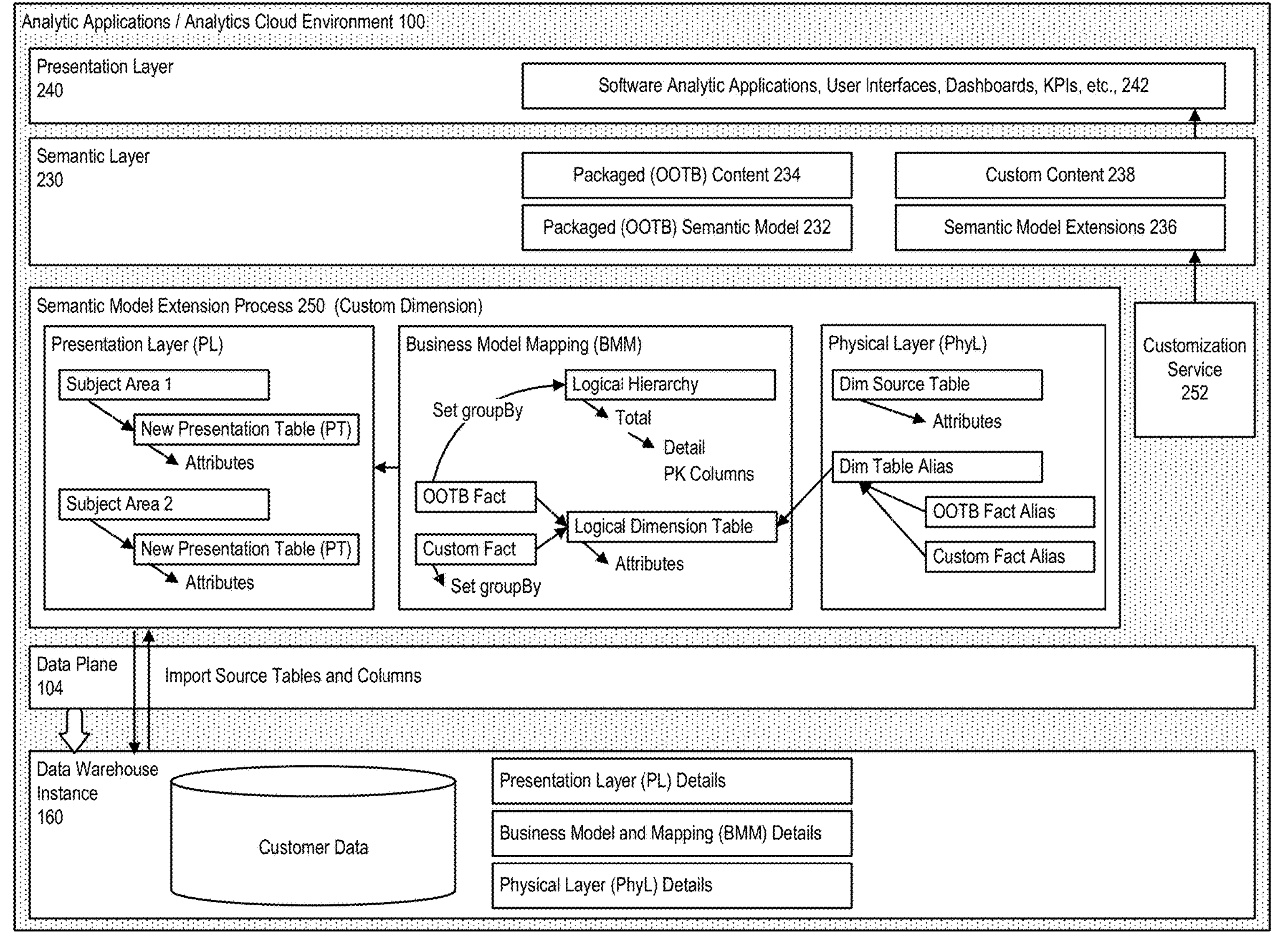
FIG. 8 further illustrates an example of extending a semantic model, in accordance with an embodiment.

As illustrated in FIG. 8, in accordance with an embodiment, in order for the semantic model extension process to extend the semantic model to incorporate a custom dimension, as determined by the introspected data, the workflow is driven by OOTBJoins as well as custom dimension joins (e.g., customDimFactJoins).

In accordance with an embodiment, in the business model and mapping layer, the srcAlias is used to define a logical dimension table linked to a hierarchy, with primary key (PK) columns added to the detail level.

In accordance with an embodiment, a logicalTblDetails mapping provides the information required for defining the joins to out-of-the-box or custom facts, as well as setting a group-by (e.g., groupBy) level in fact logical table sources. The columns are then similarly added to a new presentation table (PT) in each user-selected or custom subject area map (customSAMap).

Figure 9:
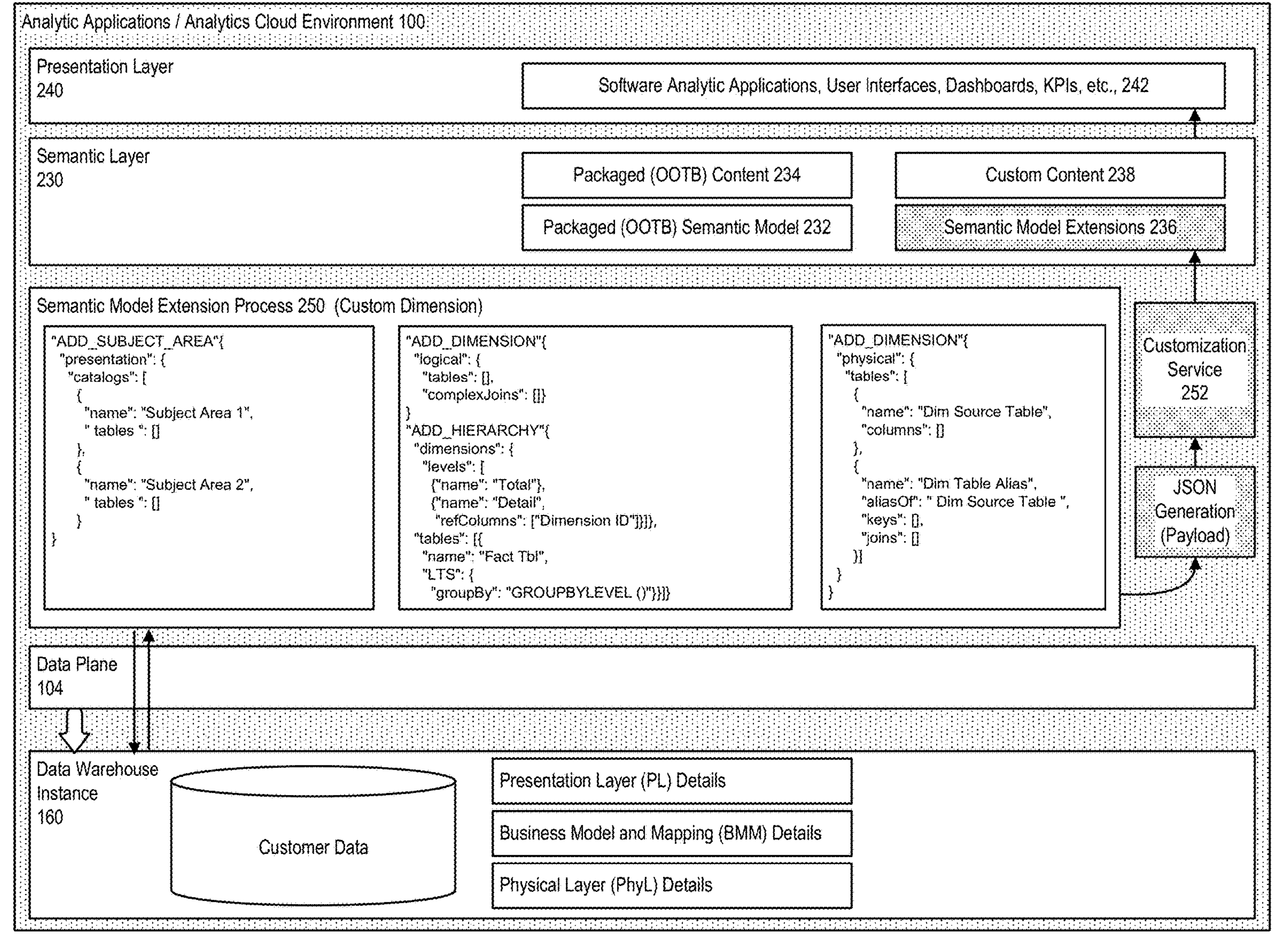
FIG. 9 further illustrates an example of extending a semantic model, in accordance with an embodiment.

By way of example to illustrate the above workflow, FIG. 9 illustrates an example JSON information or payload provided as an output by the semantic model extension process, which can then be provided to the customization service (extension service), and used to update or extend the semantic model to include the custom dimension associated with the customer's data.

Extensions

Figure 10:
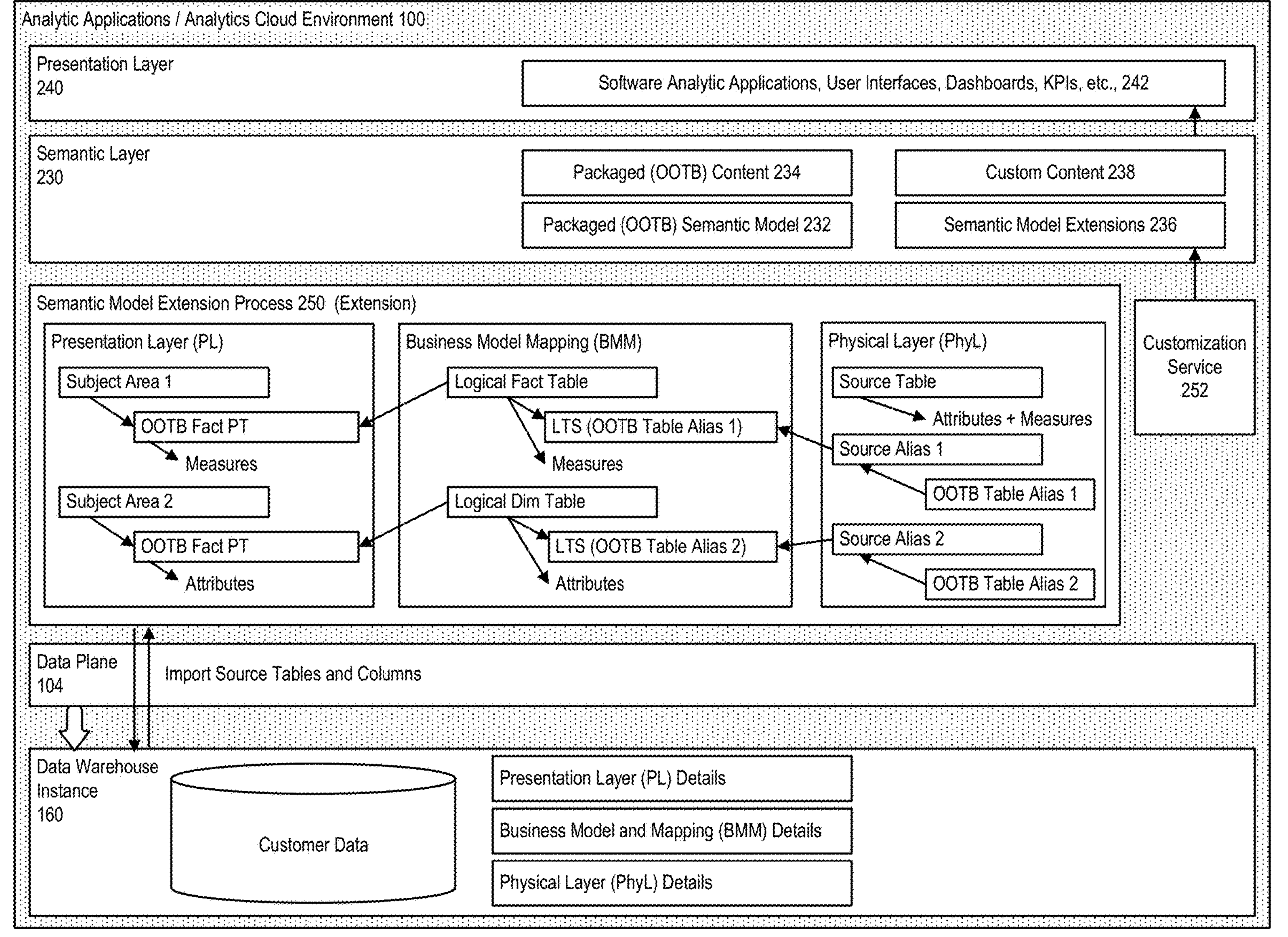
FIG. 10 further illustrates an example of extending a semantic model, in accordance with an embodiment.

As illustrated in FIG. 10, in accordance with an embodiment, in order for the semantic model extension process to extend the semantic model to incorporate an extension to the semantic model, as determined by the introspected data, the workflow includes, in the physical layer, a new source alias (e.g., srcAlias) is created for every target alias (e.g., tgtAlias) of the out-of-the-box table that the source table joins to.

In accordance with an embodiment, using tgtAlias and logicalTblDetails mapping, logical tables are determined for adding attributes/measures. The columns are then exposed in the out-of-the-box presentation tables.

Figure 11:
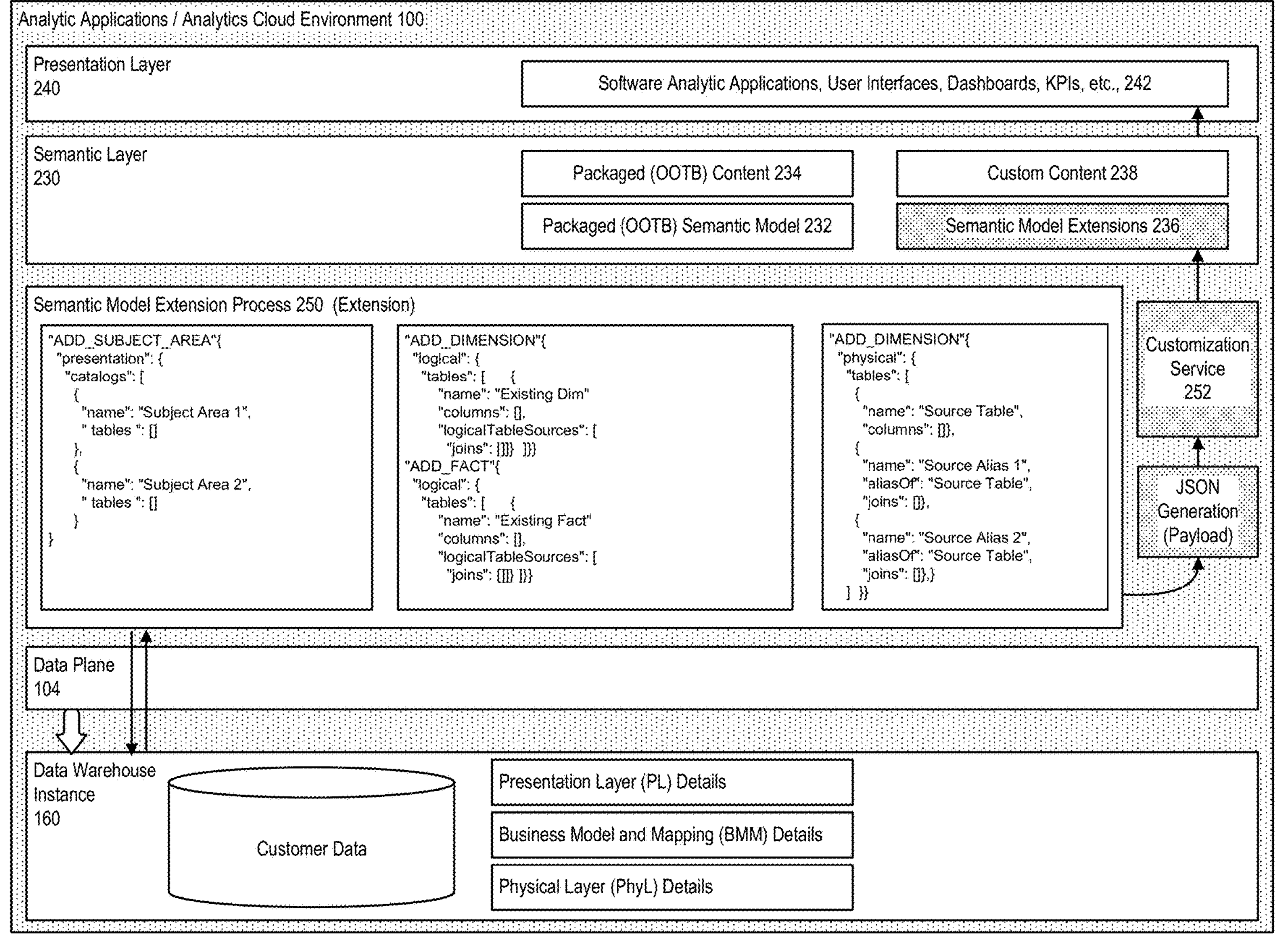
FIG. 11 further illustrates an example of extending a semantic model, in accordance with an embodiment.

By way of example to illustrate the above workflow, FIG. 11 illustrates an example JSON information or payload provided as an output by the semantic model extension process, which can then be provided to the customization service (extension service), and used to update or extend the semantic model to include the extension associated with the customer's data.

Bridge Extensions

Figure 12:
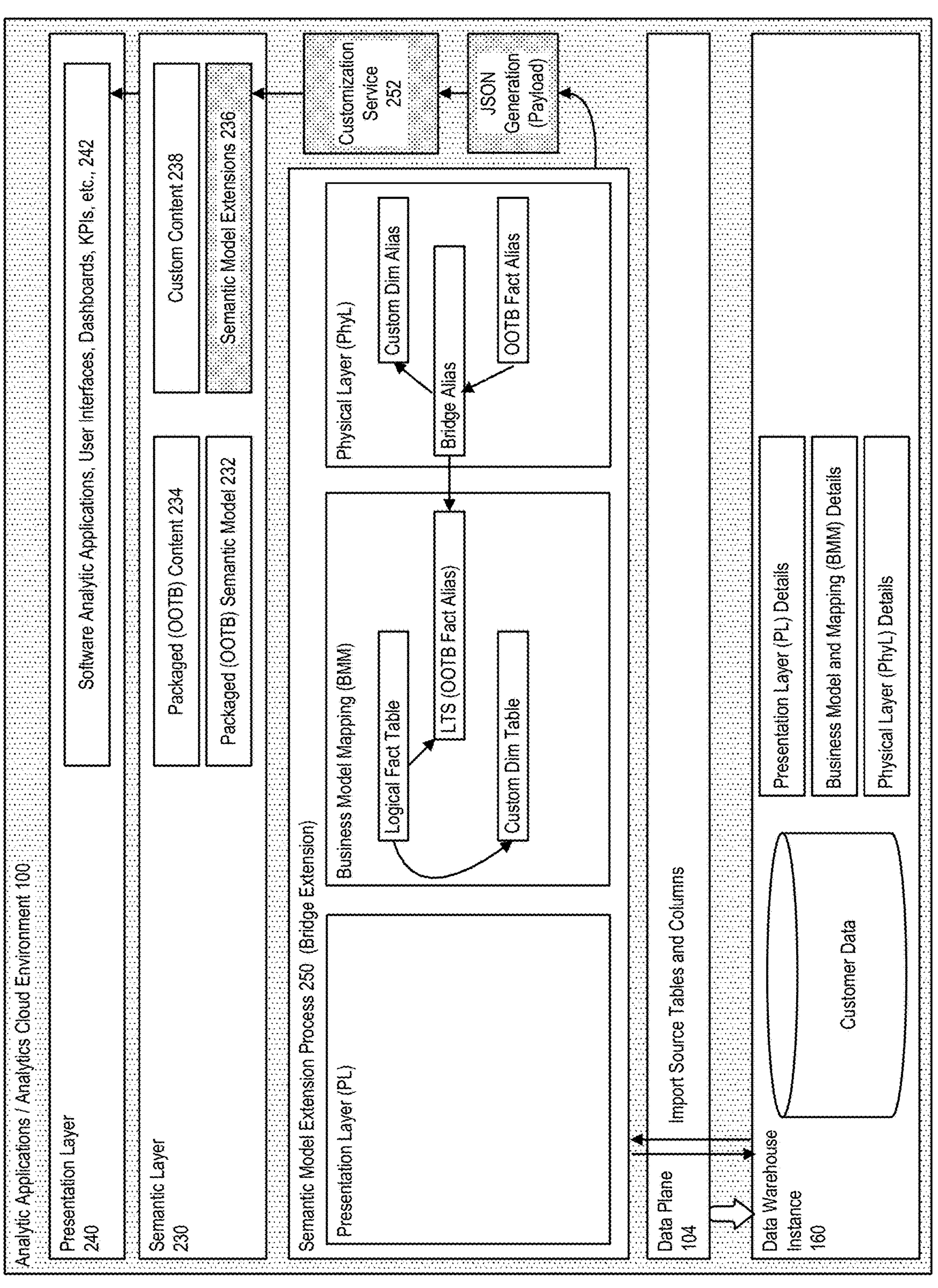
FIG. 12 further illustrates an example of extending a semantic model, in accordance with an embodiment.
Figure 13:
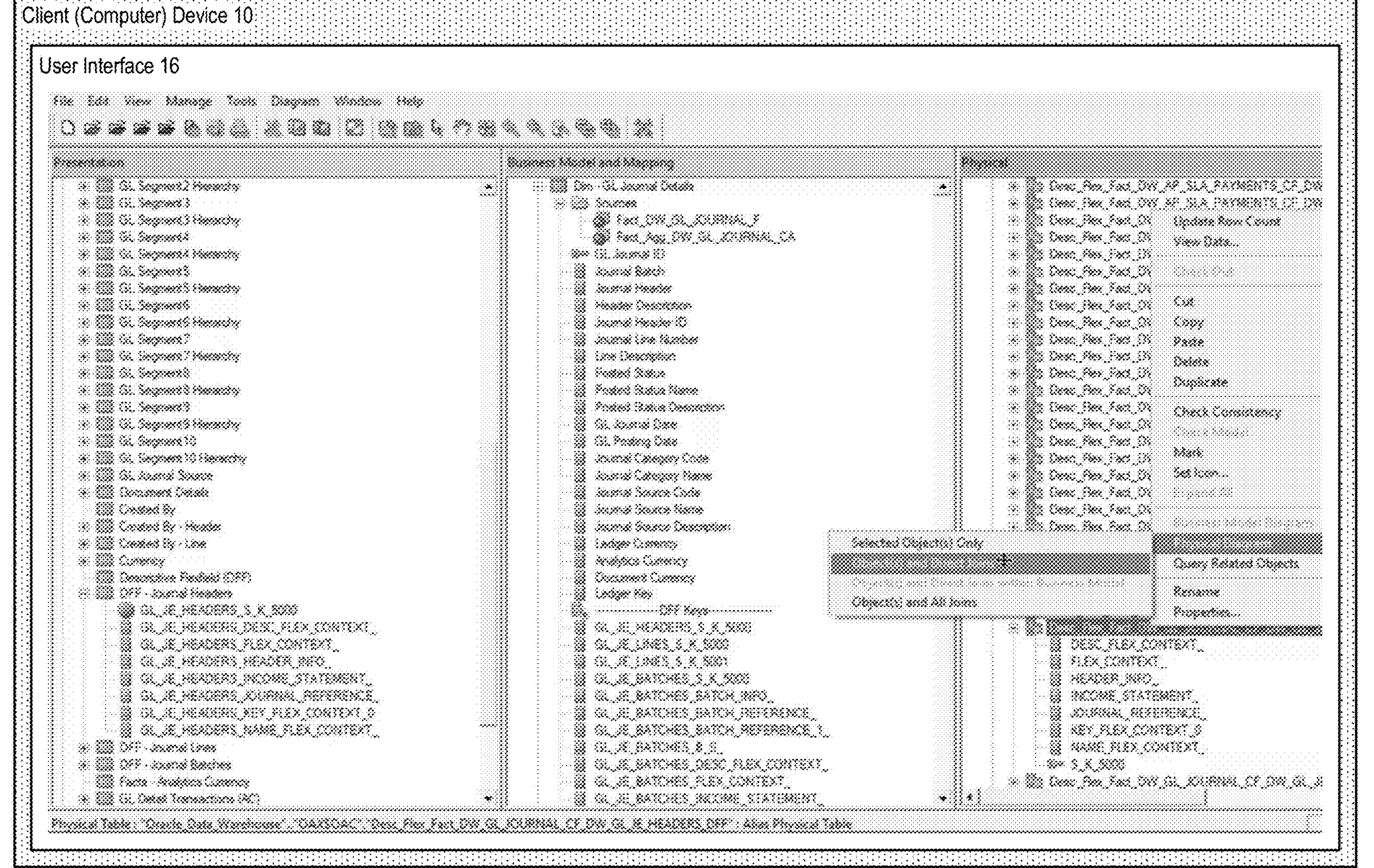
FIG. 13 illustrates an example user interface for use in reviewing, managing, or extending a semantic model, in accordance with an embodiment.
Figure 14:
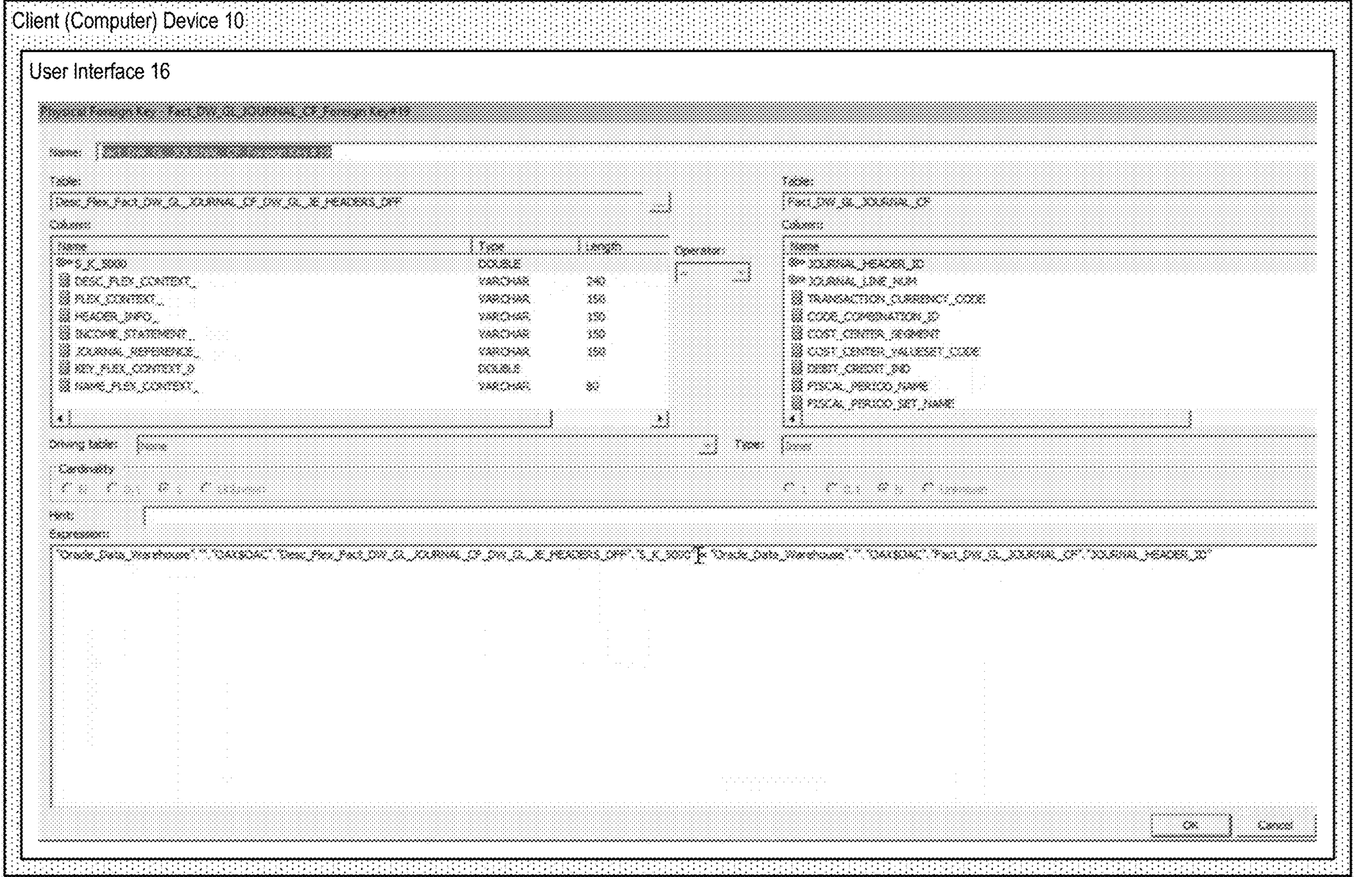
FIG. 14 further illustrates an example user interface for use in reviewing, managing, or extending a semantic model, in accordance with an embodiment.
Figure 15:
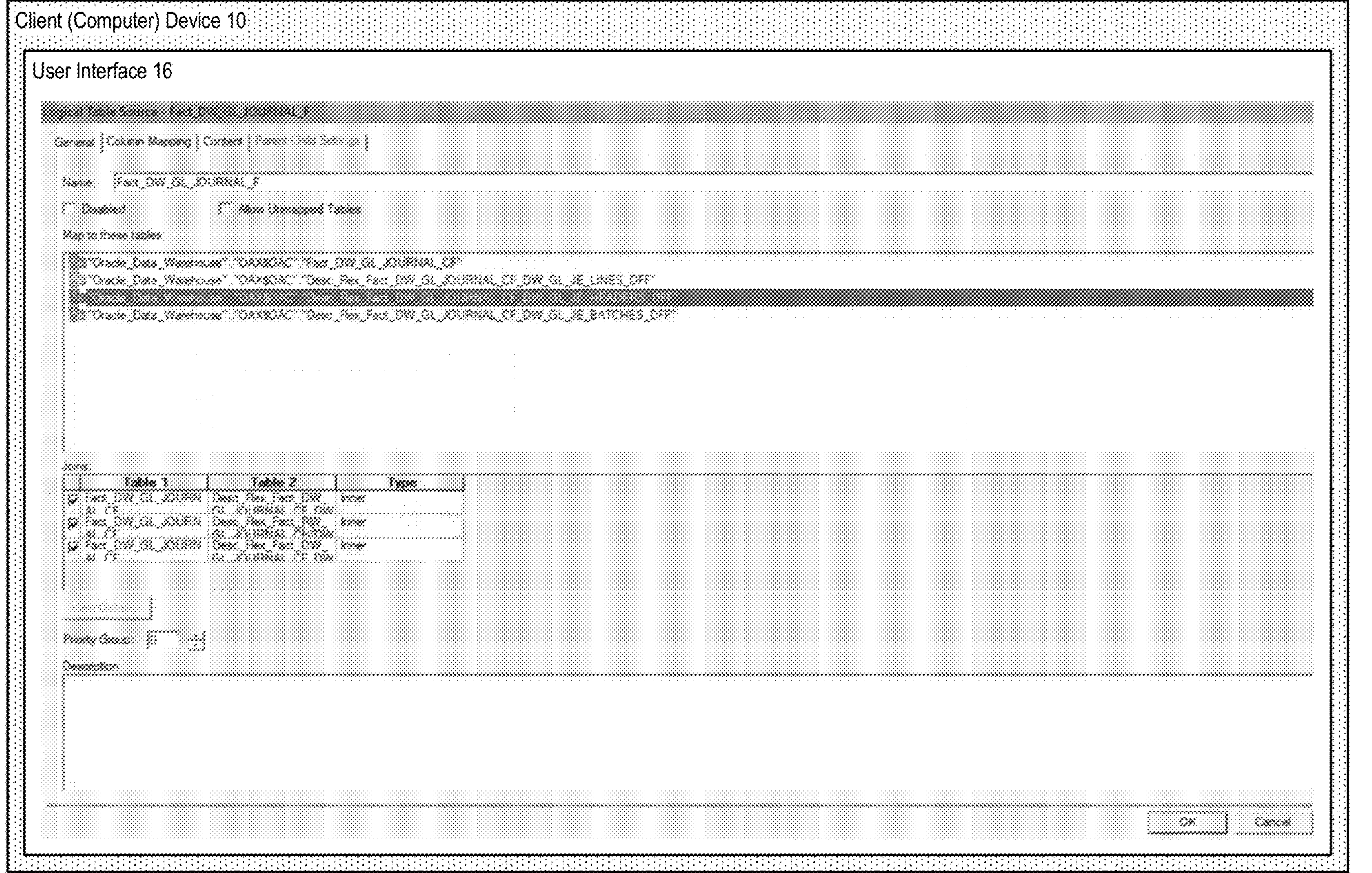
FIG. 15 further illustrates an example user interface for use in reviewing, managing, or extending a semantic model, in accordance with an embodiment.
Figure 16:
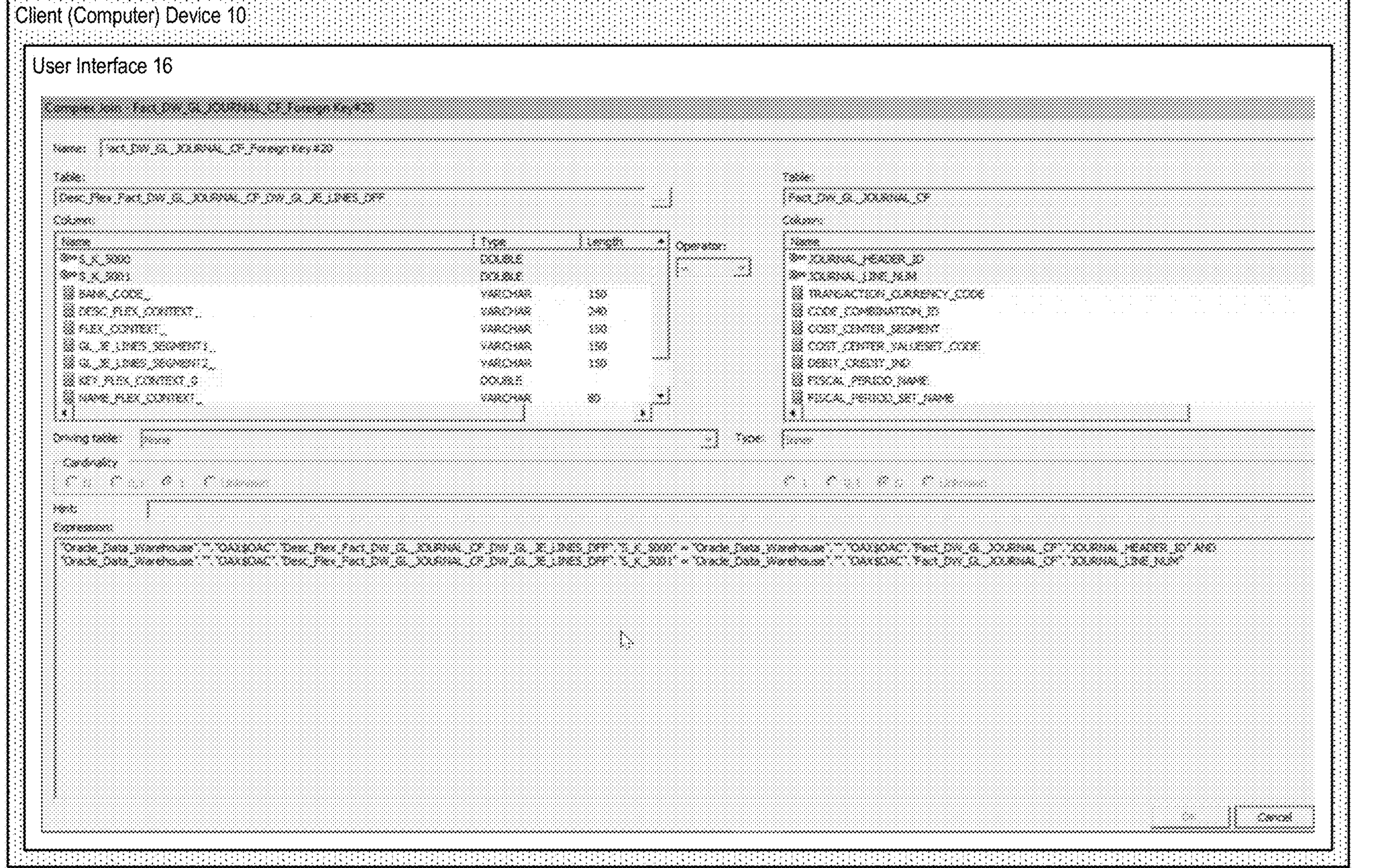
FIG. 16 further illustrates an example user interface for use in reviewing, managing, or extending a semantic model, in accordance with an embodiment.

As illustrated in FIG. 12, in accordance with an embodiment, in order for the semantic model extension process to extend the semantic model to incorporate a bridge extension, as determined by the introspected data—which as described above can be provided as an extension that can join an out-of-the-box fact to a custom dimension, the workflow includes:

(1) At the physical layer: Driven by bridge joins; create a bridge alias for the srcTbl; define a join from alias of out-of-the-box fact; add a join to custom dimension alias; and (2) At the business modelling and mapping layer: Add the bridge alias to the fact LTS; and define a complex join between out-of-the-box fact and the customer dimension.

User Interface for Extending Semantic Model

In accordance with an embodiment, the system can support the use of an interactive tool or user interface (such as for example, in an Oracle environment, a BI Administration Tool), that enables a user to view or manage the contents of a semantic model defined by, e.g., an RPD repository/file, including any extensions to the semantic model provided by the semantic model extension process.

FIGS. 13-16 illustrate an example user interface for use in reviewing, managing, or extending a semantic model, in accordance with an embodiment.

As illustrated in FIGS. 13-16, in accordance with an embodiment, the user interface enables access to or management of a semantic model, e.g., as provided by an RPD, which can include a physical layer that maps to a physical data model; a business model and mapping layer that operates as a logical mapping; and a presentation layer that enables access to the data content.

In accordance with an embodiment, using the above-described approach, the system can introspect a customer's data and determine, for example, custom facts, custom dimensions, or other customizations or extensions to the data source model, and automatically modify or extend the semantic model to support those customizations or extensions, which can be further viewed or managed as appropriate via the user interface.

For example, the described approach can be used to augment reports by choosing specific columns from various data stores, extending an existing entity or group of facts, by adding a new dimension in the target instance, and/or adding a new fact in the target instance, to create an augmented data set. The augmented data set can then be used, for example, to create data pipelines for functional areas, populate tables in a data warehouse instance, or use the data for visualization and analysis.

The above examples of user interface, screens, and dialogs, are provided by way of example, to illustrate the embodiment therein, and to illustrate the process by which a user can use the system to extend a semantic model. In accordance with other embodiments, other types and variations of user interfaces, screens, or dialogs can be used.

Semantic Extension Process

Figure 17:
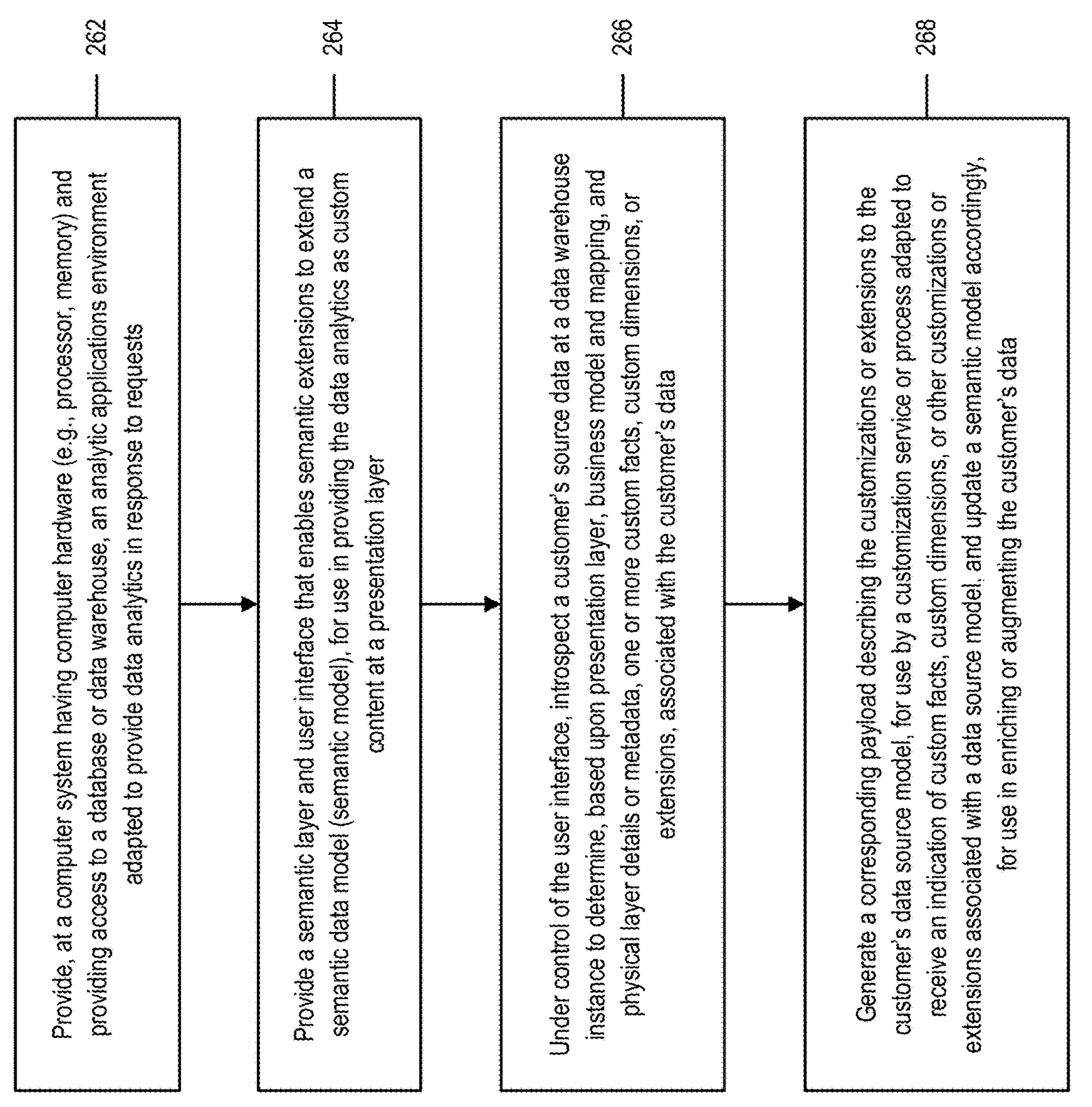
FIG. 17 illustrates a flowchart of a process for extending a semantic model, in accordance with an embodiment.

FIG. 17 illustrates a flowchart of a process for extending a semantic model, in accordance with an embodiment.

As illustrated in FIG. 17, in accordance with an embodiment, at step 262, a computer system is provided, having computer hardware (e.g., processor, memory) and providing access to a database or data warehouse, together with an analytic applications environment adapted to provide data analytics in response to requests.

At step 264, a semantic layer and user interface are provided, that enable semantic extensions to extend a semantic data model (semantic model), for use in providing the data analytics as custom content at a presentation layer.

At step 266, under control of the user interface, the system can introspect a customer's source data at a data warehouse instance to determine, based upon presentation layer, business model and mapping, and physical layer details or metadata, one or more custom facts, custom dimensions, or extensions, associated with the customer's data.

At step 268, the system can generate a corresponding payload describing the customizations or extensions to the customer's data source model, for use by a customization service or process adapted to receive an indication of custom facts, custom dimensions, or other customizations or extensions associated with a data source model, and update a semantic model accordingly, for use in enriching or augmenting the customer's data.

Data Validation

As described above, in accordance with an embodiment, the system provides a method for extending a semantic model, for use with an analytic applications, analytics cloud, or other type of business intelligence or data analytics environment. In accordance with an embodiment, the system can include an administrative console application and user interface that allows a user to view and validate a customer's data as loaded from their source environment into a data warehouse instance for use with other types of data analytics environments.

For example, in accordance with an embodiment, the administrative console application and user interface enables a user to validate a customer's source data as loaded from their source environment into a Fusion Analytics Warehouse (FAW) instance, as compared with the storage or representation of that data when moved to or used in the customer's Oracle Transactional Business Intelligence (OTBI) instance.

In accordance with an embodiment, prerequisites for validating the data include that the user can access both source/target systems, e.g., the customer's Fusion Analytics Warehouse instance and the corresponding OTBI instance, with the same data security privileges.

During validation, a user with appropriate access to the customer data, in both the source and target systems, can select a set of data metrics and parameter values by which to view and compare the data values in both systems.

The user can also define rules, which at the end of a data movement between the source and target systems, can be applied to assess the validity of the moved data. For example, a report can be generated and displayed to the user; for example to indicate one or more data records in a source data that are not in a target data; data records in the source and target which are different; or different granularities of data such as instances wherein the data types appear to match but the actual data is different.

In accordance with an embodiment, data validation can accommodate customizations or changes to the semantic model, for example as provided by semantic model extension process described above.

User Interface for Validating Data

FIGS. 18-25 illustrate an example user interface for use in validating a customer data, in accordance with an embodiment.

Figure 18:
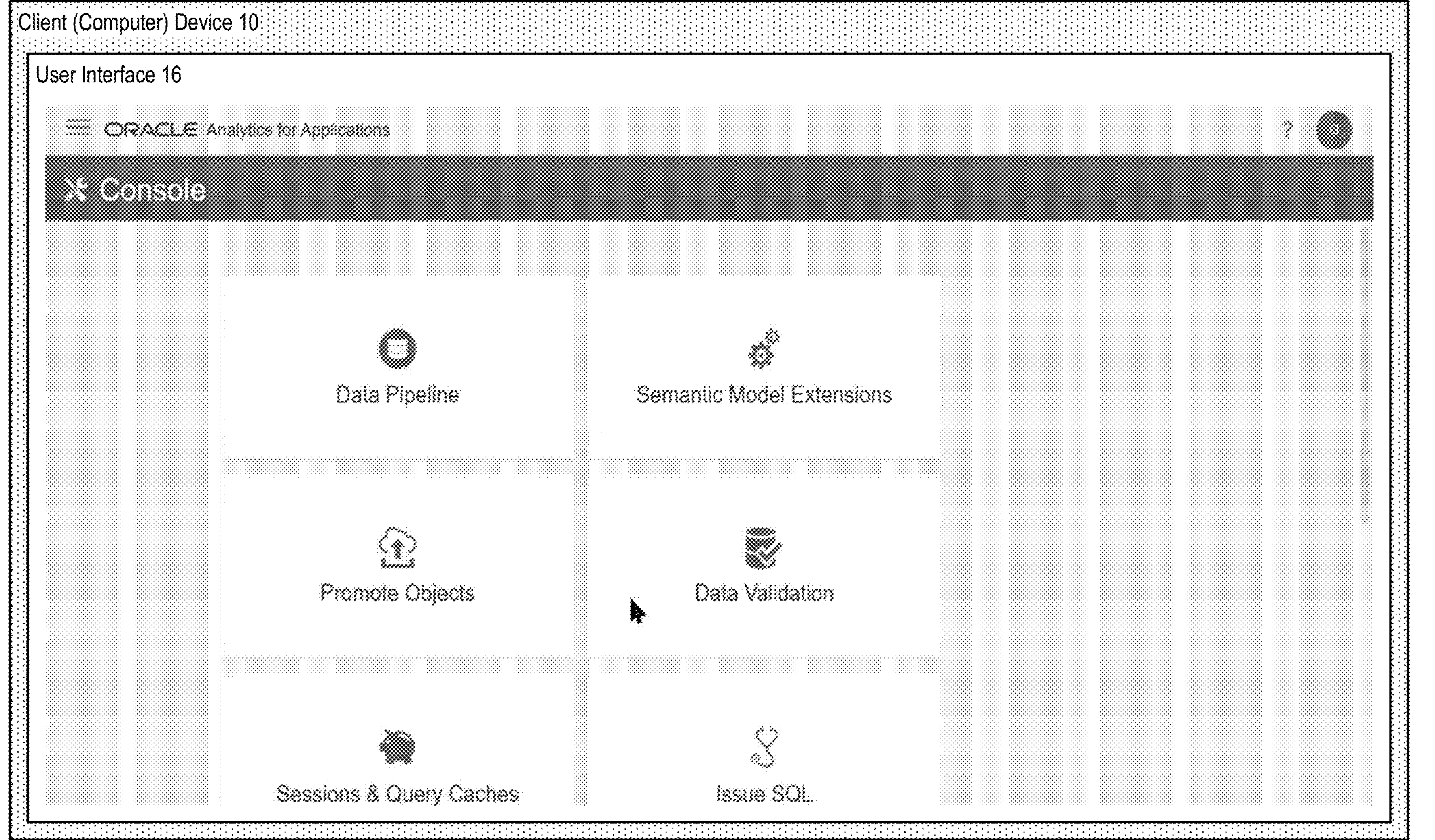
FIG. 18 illustrates an example user interface for use in validating a customer data, in accordance with an embodiment.

For example, as illustrated in FIG. 18, in accordance with an embodiment, the system can include an administrative console application and user interface that allows a user to select a "Data Validation" option.

Figure 19:
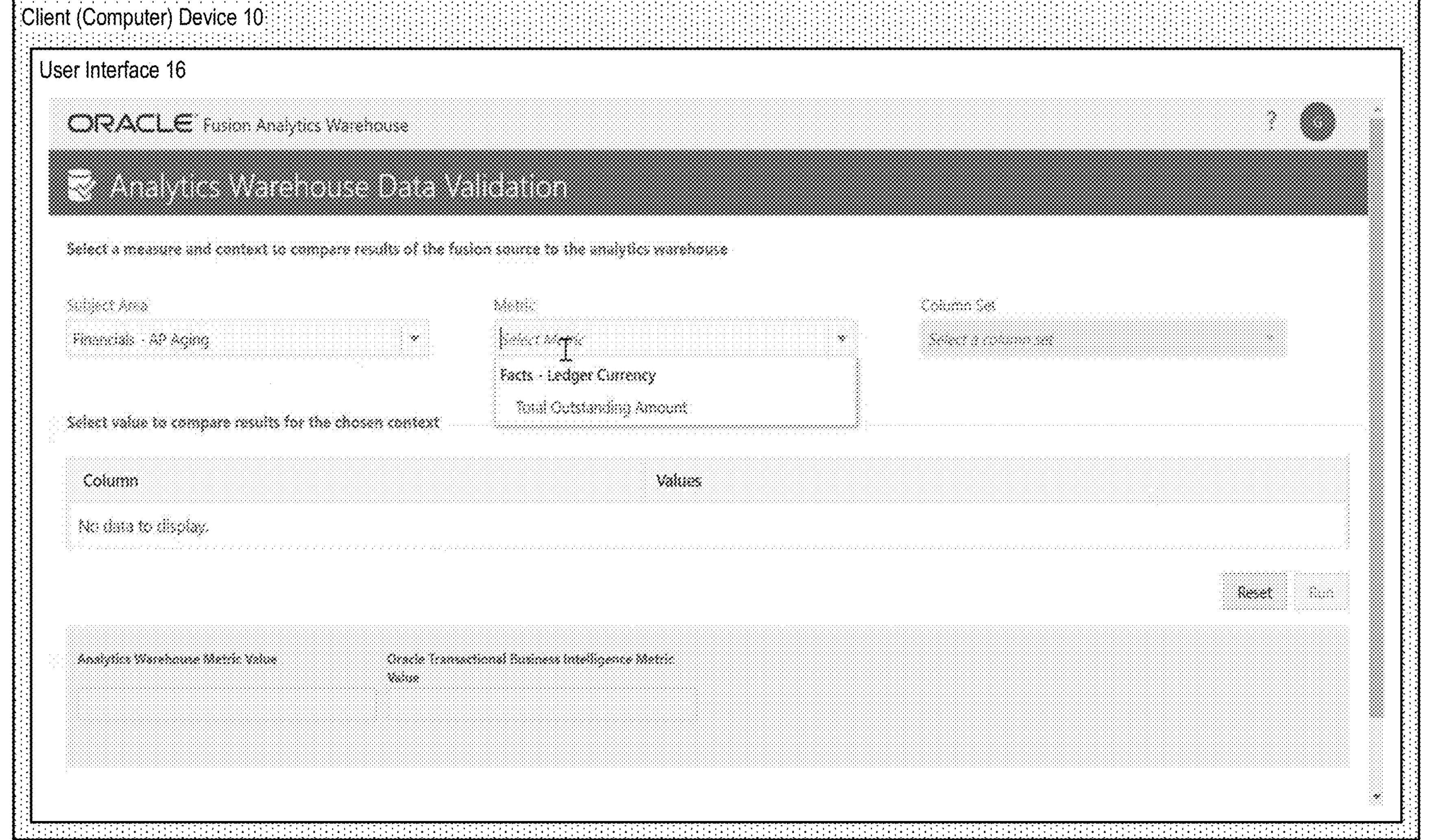
FIG. 19 further illustrates an example user interface for use in validating a customer data, in accordance with an embodiment.
Figure 20:
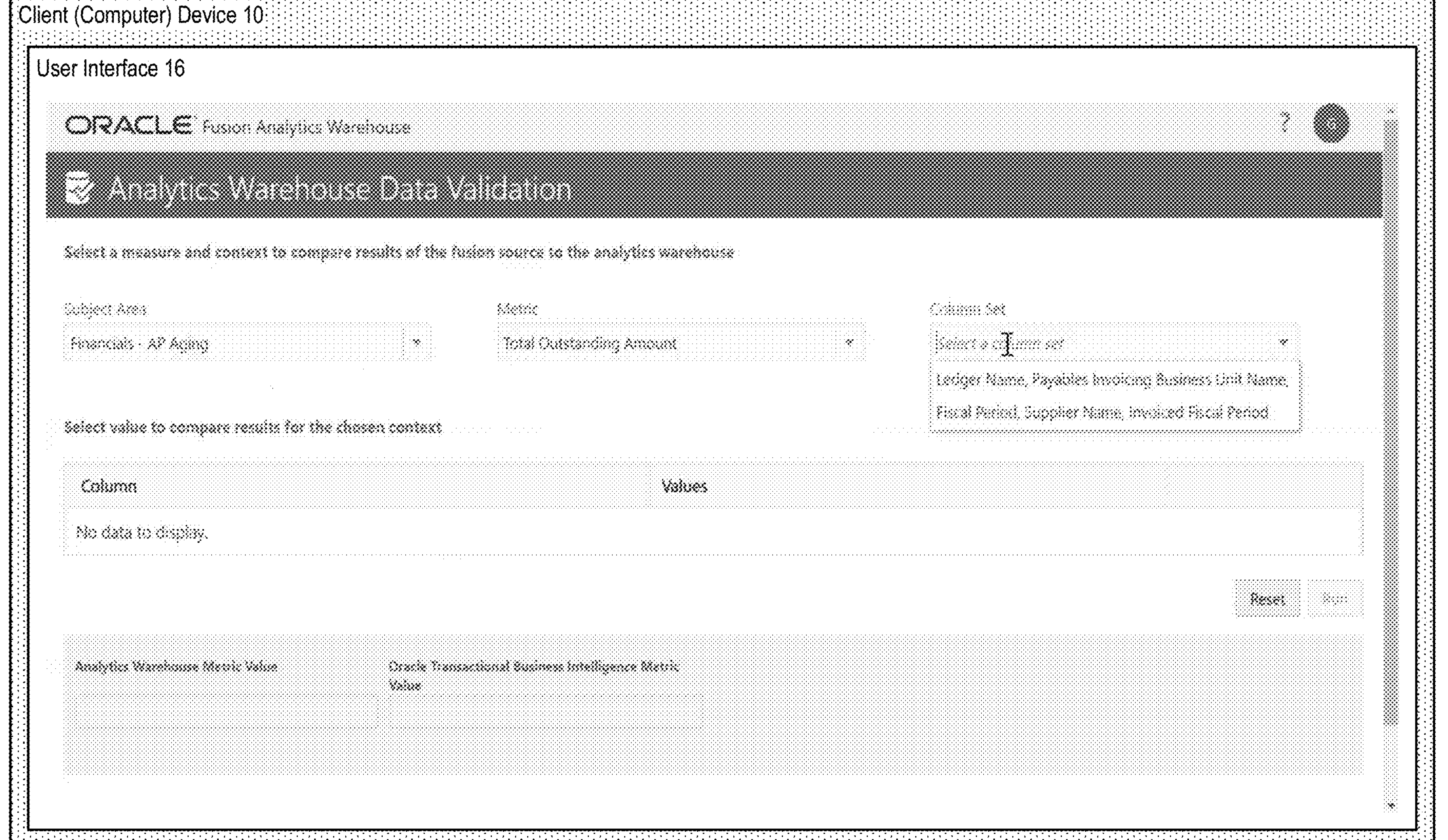
FIG. 20 further illustrates an example user interface for use in validating a customer data, in accordance with an embodiment.

As illustrated in FIGS. 19-20, in accordance with an embodiment, the administrative console application allows a user to view and validate a customer's source data as loaded from their source environment, e.g., Fusion Analytics Warehouse (FAW) instance, as compared with the storage or representation of that data when moved to or used in the target environment, e.g., Oracle Transactional Business Intelligence (OTBI) instance.

By way of example to illustrate the function of the administrative console application, in accordance with an embodiment, the user is prompted to select a measure and context for purposes of data validation, for example a subject area such as "Financials—AP Aging"; and a metric related to the selected subject area, for example "Facts—Ledger Currency Total Outstanding Amount".

In accordance with an embodiment, the user is also prompted to select a column set that they would like to validate, such as in this example any of "Ledger Name", "Payables Invoicing Business Unit Name", "Fiscal Period", "Supplier Name", or "Invoiced Fiscal Period".

Figure 21:
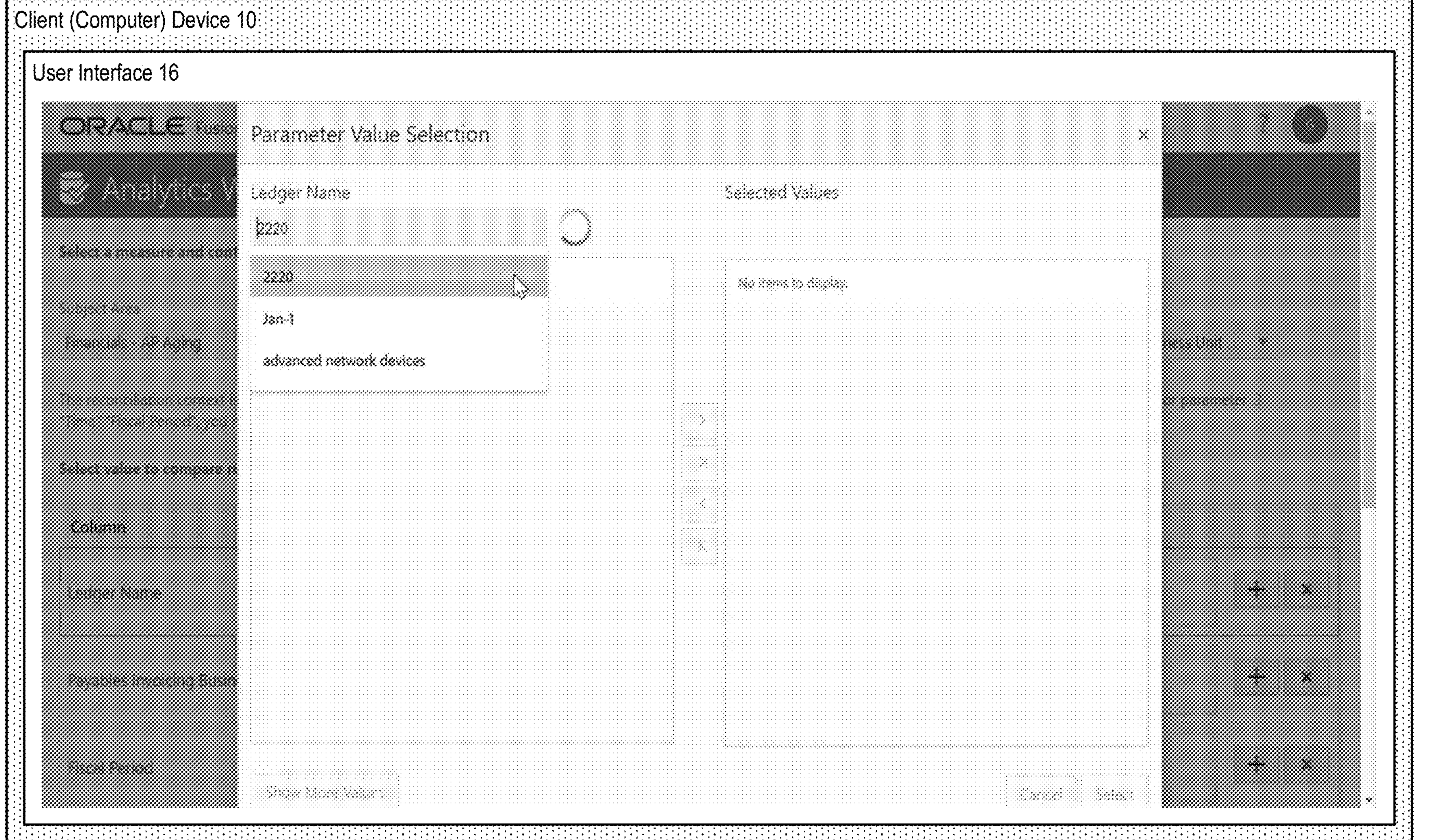
FIG. 21 further illustrates an example user interface for use in validating a customer data, in accordance with an embodiment.

As illustrated in FIG. 21, in accordance with an embodiment, the administrative console application prompts the user to select one or more data attribute columns by which the data validation details can be pivoted on in the displayed user interface.

By way of example to illustrate the function of the administrative console application, in accordance with an embodiment, the user can indicate a parameter value selection associated with a first column, in this example "Ledger Name", and then either select within the values that are displayed, or search for particular values, or request a display of additional values, and then move selected values to a "Selected Values" field within the user interface, to indicate to the administrative console application which data columns are to be selected for validation purposes.

In accordance with an embodiment, data validation can accommodate customizations or changes to the semantic model, for example as provided by semantic model extension process described above.

Figure 22:
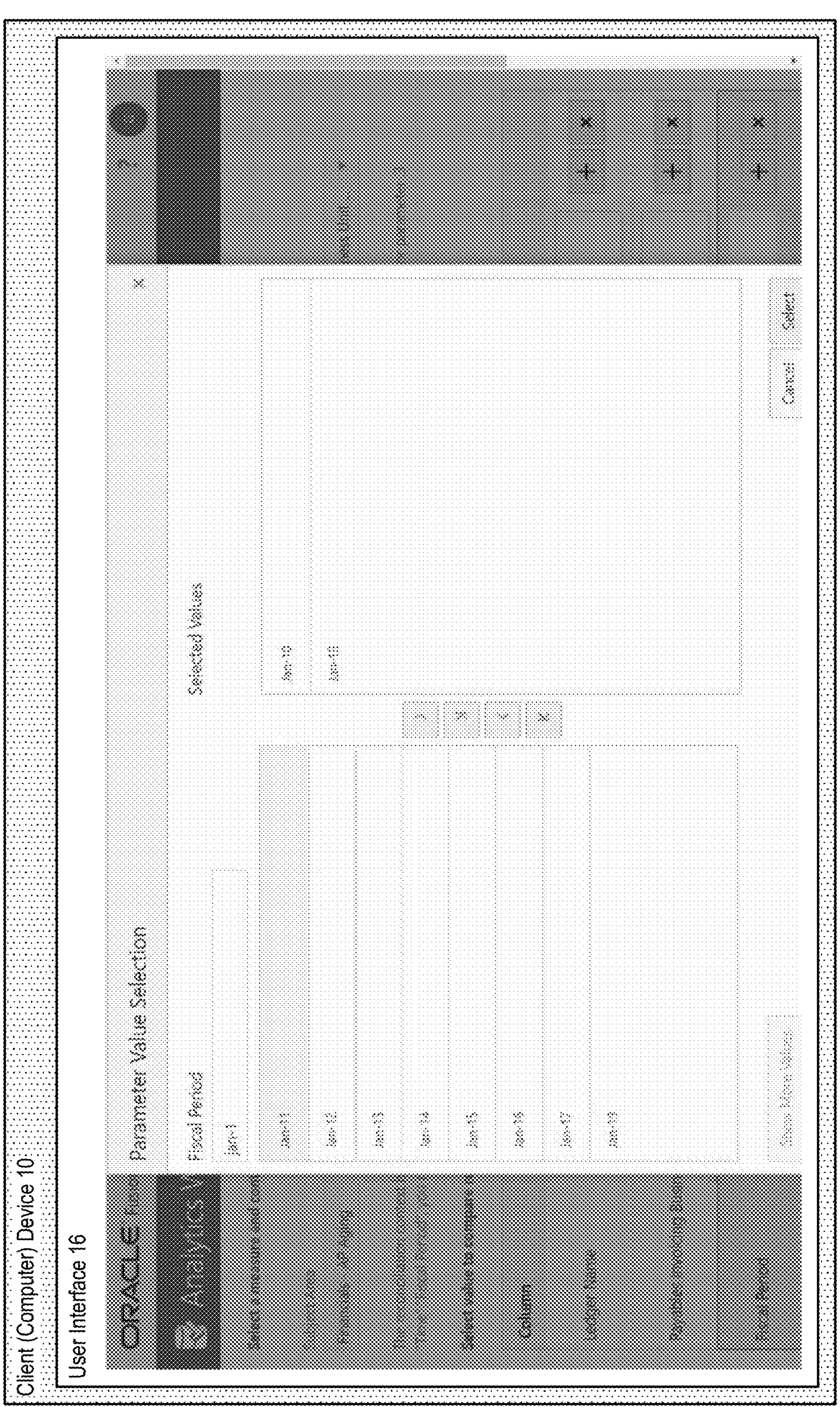
FIG. 22 further illustrates an example user interface for use in validating a customer data, in accordance with an embodiment.

As illustrated in FIG. 22, in accordance with an embodiment, the user can repeat the steps of indicating a parameter value selection for a second or subsequent column, in this example "Fiscal Period", clicking "Retain" each time.

Figure 23:
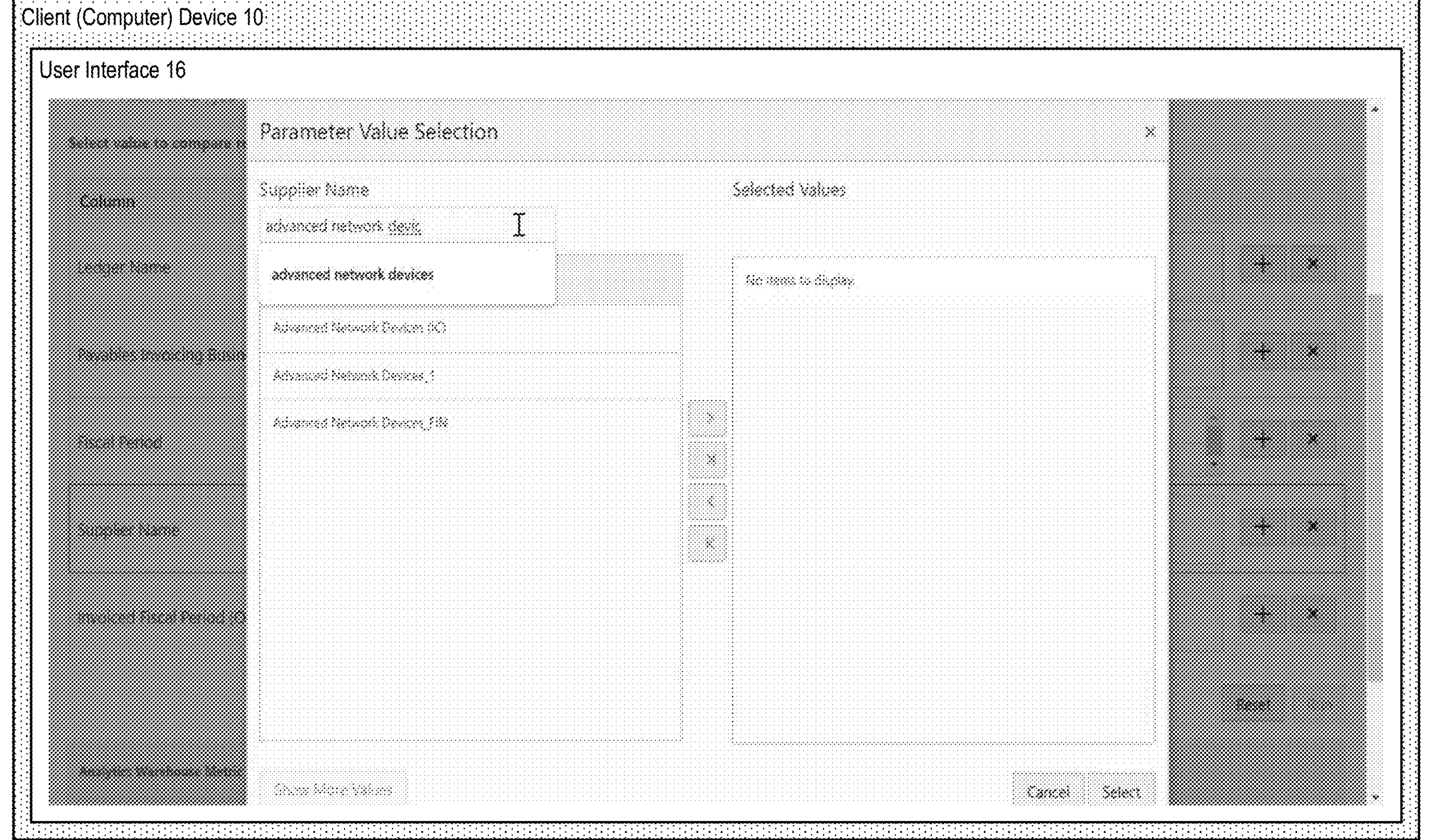
FIG. 23 further illustrates an example user interface for use in validating a customer data, in accordance with an embodiment.

As illustrated in FIG. 23, in accordance with an embodiment, the user can repeat the steps of indicating a parameter value selection for a second or subsequent column, in this example "Supplier Name".

Figure 24:
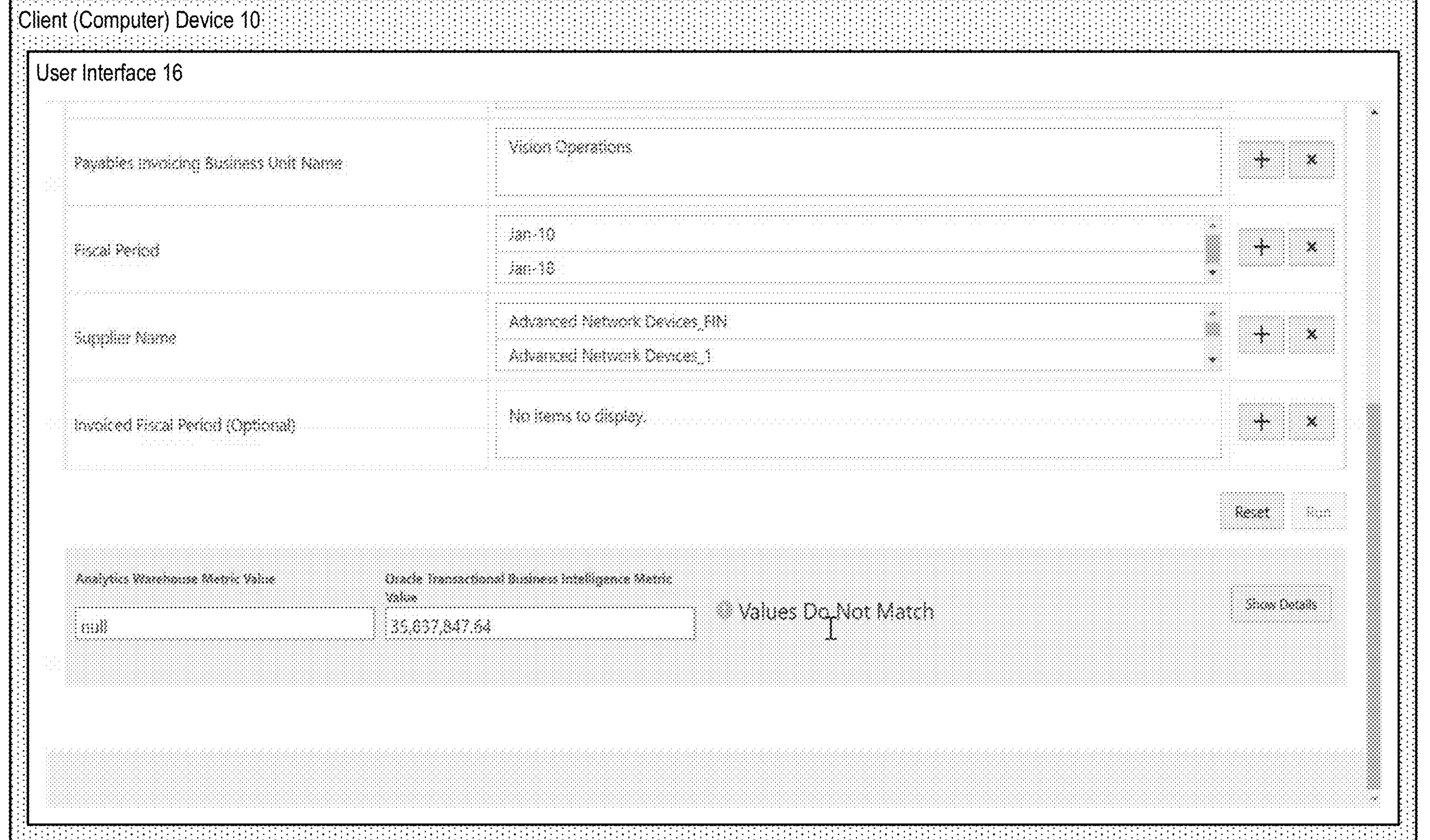
FIG. 24 further illustrates an example user interface for use in validating a customer data, in accordance with an embodiment.
Figure 25:
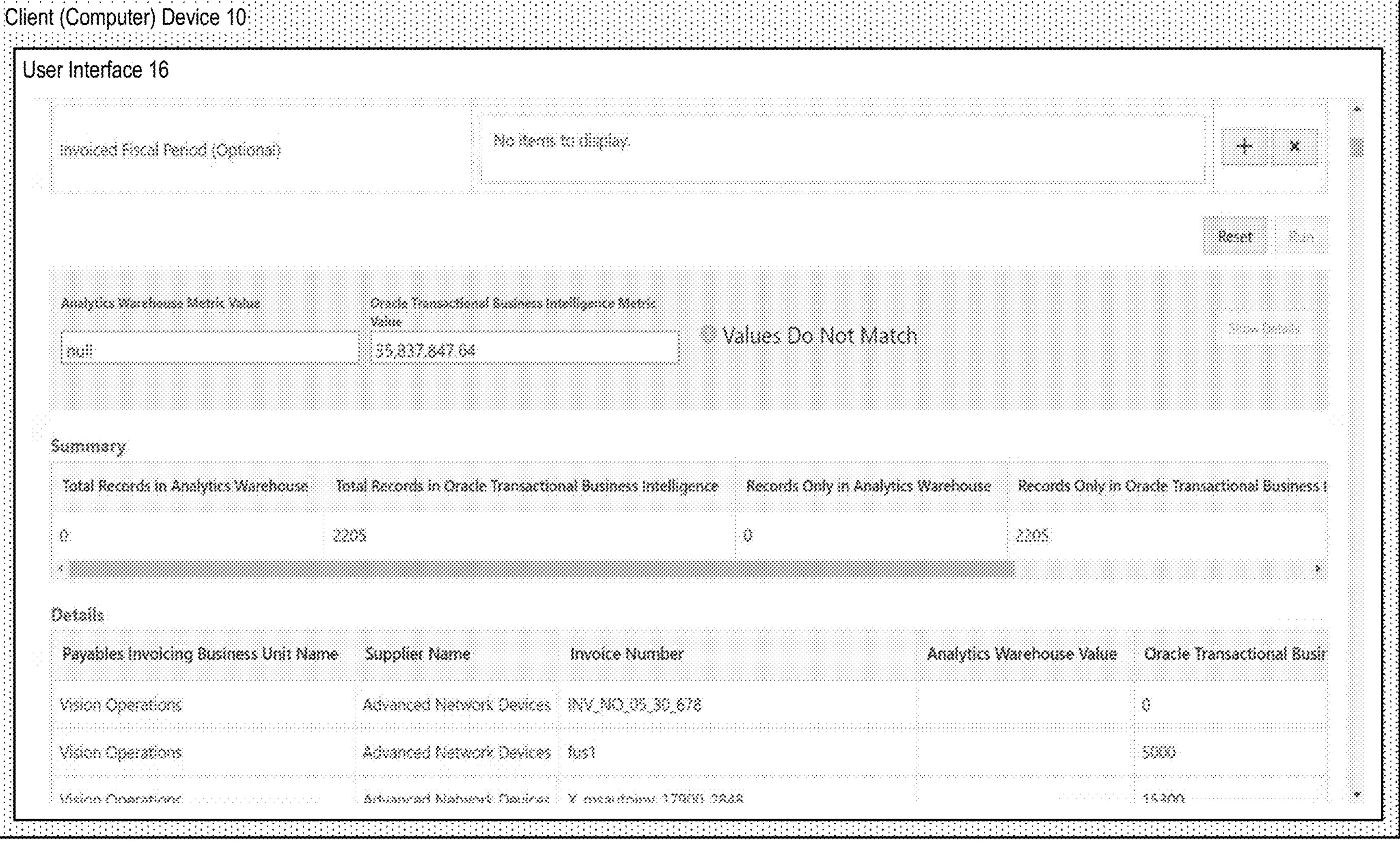
FIG. 25 further illustrates an example user interface for use in validating a customer data, in accordance with an embodiment.

As illustrated in FIG. 24-25, in accordance with an embodiment, when the above procedure has been completed for all tables and columns which are to be selected for validation purposes, the administrative console application allows the user to "Run" the process of data validation which causes the system to compare the metric values, for the tables and columns selected for validation purposes, in a customer's source environment, e.g., Fusion Analytics Warehouse (FAW) instance, as compared with the storage or representation of that data when moved to or used in the customer's target environment, e.g., Oracle Transactional Business Intelligence (OTBI) instance.

In accordance with an embodiment, each time the administrative console application is instructed to run the process of data validation, the console application, e.g., by way of a detail table, displays the actual data metric values, and differences between the source/target (e.g., FAW/OTBI) instances, as defined by the tables and columns selected for validation purposes; with the system retrieving and displaying actual data at those source/target environments, along with differences between the data and an indication when the data values do not match.

In accordance with an embodiment, the administrative console application provides a "Show Details" option that allows the user to generate a summary and/or display a detailed drill-down of the metric values in the source and target instances.

The above examples of user interface, screens, and dialogs, are provided by way of example, to illustrate the embodiment therein, and to illustrate the process by which a user can use the system to validate a movement of data as supported by a semantic model. In accordance with other embodiments, other types and variations of user interfaces, screens, or dialogs can be used.

Data Validation Process

Figure 26:
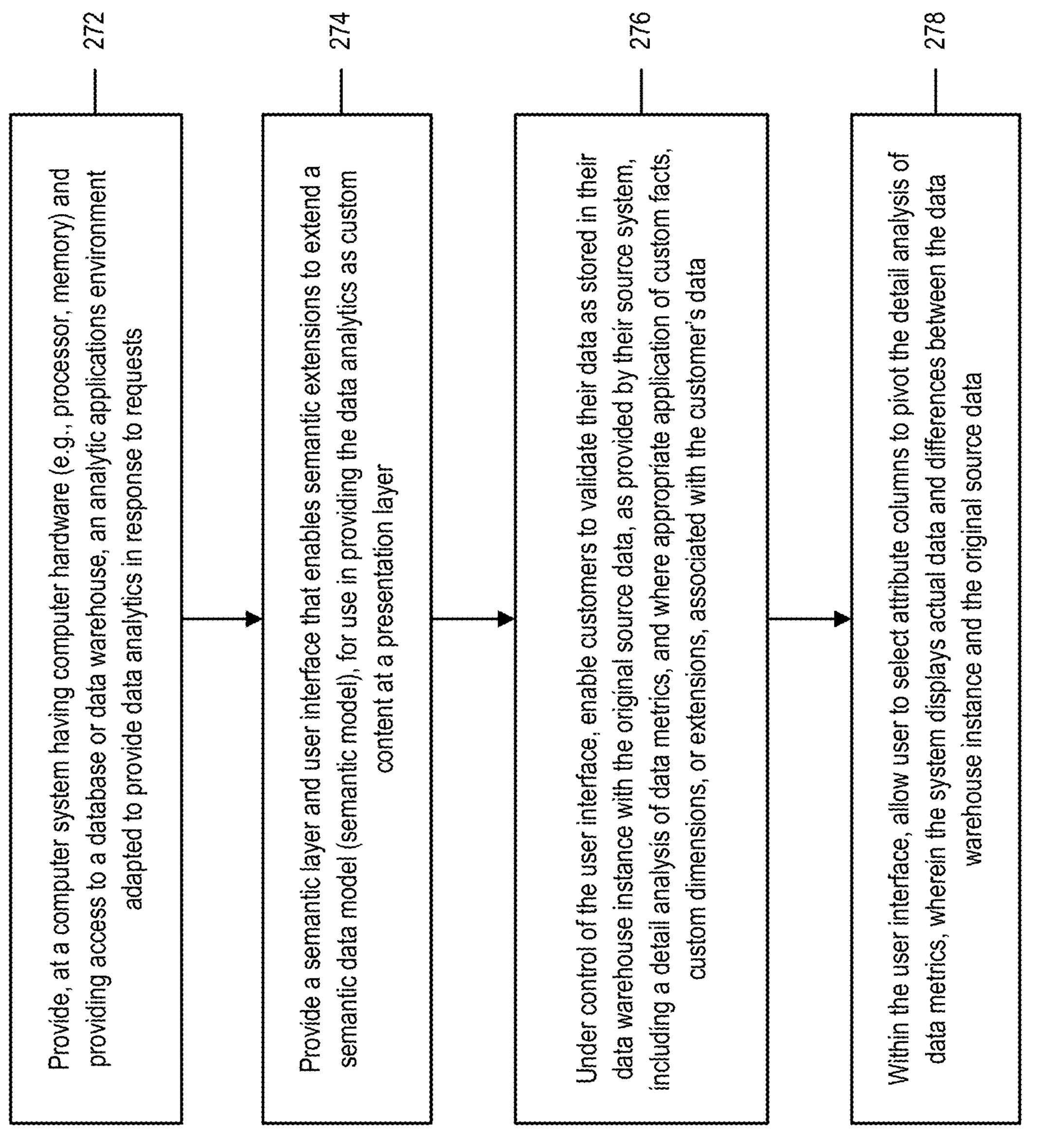
FIG. 26 illustrates a flowchart of a process for use in validating a customer data, in accordance with an embodiment.

FIG. 26 illustrates a flowchart of a process for use in validating a customer data, in accordance with an embodiment.

As illustrated in FIG. 26, in accordance with an embodiment, at step 272, a computer system is provided, having computer hardware (e.g., processor, memory) and providing access to a database or data warehouse, together with an analytic applications environment adapted to provide data analytics in response to requests.

At step 274, a semantic layer and user interface are provided, that enable semantic extensions to extend a semantic data model (semantic model), for use in providing the data analytics as custom content at a presentation layer.

At step 276, under control of the user interface, the system enables customers to validate their data as stored in their data warehouse instance with the original source data, as provided by their source system, including a detail analysis of data metrics, and where appropriate application of custom facts, custom dimensions, or extensions, associated with the customer's data.

At step 278, within the user interface, the system allows the user to select attribute columns to pivot the detail analysis of data metrics, wherein the system displays actual data and differences between the data warehouse instance and the original source data.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; and that a semantic model can be extended to incorporate, e.g., custom facts, custom dimensions; and that JSON information or payloads can be generated and used to extend the semantic model; in accordance with various embodiments, the systems and methods described herein can be used with other types of enterprise software application or data environments, cloud environments, cloud services, cloud computing, or other computing environments; and can support other types of extensions to a semantic model, or other types of payloads or means of providing updates to the semantic model.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for extending a semantic model, for use with an analytic application, data analytics, or other business intelligence environment, comprising:

a computer including one or more processors, that provides access to a data warehouse for storage of data received from an enterprise software application or data environment, wherein the data warehouse includes:

an analytic applications schema, and for each customer of a plurality of customers, a customer schema that is used to supplement and utilize the customer's data within their own data warehouse instance;

wherein the system operates a process that executes at intervals to extract the data from a customer's enterprise software application or data environment, and transform the extracted data into a model format to be loaded into the customer schema of their data warehouse instance;

wherein the system includes a semantic model for use with the data that enables surfacing of data analytics or other business intelligence data at a presentation layer, including wherein the semantic model includes a metadata that defines one or more schemas, mappings, table navigation, or other constructs that implement the semantic model;

wherein the computer system performs a semantic model extension process that:

introspects the customer's data stored in the data warehouse instance, including importing one or more source table and columns, evaluates the metadata associated with the one or more source table and columns to determine custom facts, custom dimensions, or extensions associated with the customer's data, and generates a payload descriptive of such customizations or extensions, wherein the payload is provided to a customization service and information provided therein is used by the customization service in performing a process or workflow and corresponding operations to modify the semantic model so as to extend or otherwise customize the semantic model, for use with the customer's data; and wherein the system provides a user interface by which customers can validate their data as stored in their data warehouse instance with an original source data, as provided by a source system, including an application of the custom facts, custom dimensions, or extensions, associated with the customer's data; and wherein the system displays actual data and differences between the data warehouse instance and the original source data.

2. The system of claim 1, further comprising an interactive tool and user interface that enables a user to manage the contents of the semantic model;

wherein during introspection by the semantic model extension process of a customer's source data, the system determines, based upon presentation layer, business model and mapping, and physical layer details or metadata, configurable by the interactive tool, the custom facts, custom dimensions, or extensions, associated with the customer's data.

3. The system of claim 1, wherein the semantic model extension process generates a payload describing the customizations or extensions to the customer's data source model, wherein the payload is provided to the customization service adapted to receive an indication of custom facts, custom dimensions, or other customizations or extensions associated with the data source model, and update the semantic model accordingly.

4. The system of claim 1, wherein the system includes an administrative console application that prompts the user to select one or more data attribute columns by which the data validation details can be pivoted on in the displayed user interface;

wherein each time the administrative console application is instructed to run the process of data validation, the console application displays the data metric values and differences between the source and target instances, as defined by the tables and columns selected for validation purposes.

5. The system of claim 1, further comprising a data plane responsible for performing extract, transform, and load (ETL) operations, including extracting transactional data from an organization's enterprise software application or data environment, transforming the extracted data into a model format, and loading the transformed data into a customer schema of the data warehouse.

6. The system of claim 1, wherein each customer or tenant of the environment is associated with their own customer tenancy within the data warehouse, that is associated with their own customer schema and is additionally provided with read-only access to the analytic applications schema.

7. The system of claim 1, wherein the metadata associated with the customer's data stored in the data warehouse instance includes one or more mapping from physical aliases to logical tables and logical table sources, and one or more logical table to subject area mappings.

8. The system of claim 1, wherein the system includes or operates with:

a physical layer having details or metadata that maps to a physical data model;

a business model and mapping layer having details or metadata that operates as a logical mapping of the data;

wherein the semantic model extension process introspects the customer's source data at their data warehouse instance to:

determine, based upon the presentation layer, business model and mapping, and physical layer details or metadata, the custom facts, custom dimensions, or extensions associated with the customer's data; and generate a corresponding payload describing the customizations or extensions to the customer's data source model;

for use by the customization service in modifying the semantic model so as to extend or otherwise customize the semantic model, for use with the customer's data.

9. The system of claim 8, wherein the physical layer details or metadata include one or more table or dimension aliases or primary keys;

wherein the business model and mapping layer details or metadata include a mapping from physical aliases to logical tables;

wherein the presentation layer includes a logical table to subject area mapping.

10. A method for extending a semantic model, for use with an analytic application, data analytics, or other business intelligence environment, comprising:

providing, at a computer including one or more processors, an analytic applications environment that that provides access to a data warehouse for storage of data received from an enterprise software application or data environment, wherein the data warehouse includes:

an analytic applications schema, and for each customer of a plurality of customers, a customer schema that is used to supplement and utilize the customer's data within their own data warehouse instance;

performing, by the computer, a process at intervals to extract the data from a customer's enterprise software application or data environment, and transform the extracted data into a model format to be loaded into the customer schema of their data warehouse instance;

providing, by the computer, a semantic model for use with the data that enables surfacing of data analytics or other business intelligence data at a presentation layer, including wherein the semantic model includes a metadata that defines one or more schemas, mappings, table navigation, or other constructs that implement the semantic model;

performing, by the computer, a semantic model extension process that:

introspects the customer's data stored in the data warehouse instance, including importing one or more source table and columns, evaluates the metadata associated with the one or more source table and columns to determine custom facts, custom dimensions, or extensions associated with the customer's data, and generates a payload descriptive of such customizations or extensions, wherein the payload is provided to a customization service and information provided therein is used by the customization service in performing a process or workflow and corresponding operations to modify the semantic model so as to extend or otherwise customize the semantic model, for use with the customer's data; and providing a user interface by which customers can validate their data as stored in their data warehouse instance with an original source data, as provided by a source system, including an application of the custom facts, custom dimensions, or extensions, associated with the customer's data; and wherein the system displays actual data and differences between the data warehouse instance and the original source data.

11. The method of claim 10, further comprising an interactive tool and user interface that enables a user to manage the contents of the semantic model;

wherein during introspection by the semantic model extension process of a customer's source data, the computer determines, based upon presentation layer, business model and mapping, and physical layer details or metadata, configurable by the interactive tool, the custom facts, custom dimensions, or extensions, associated with the customer's data.

12. The method of claim 10, wherein the semantic model extension process generates a payload describing the customizations or extensions to the customer's data source model, wherein the payload is provided to the customization service adapted to receive an indication of custom facts, custom dimensions, or other customizations or extensions associated with the data source model, and update the semantic model accordingly.

13. The method of claim 10, wherein an administrative console application prompts the user to select one or more data attribute columns by which the data validation details can be pivoted on in the displayed user interface;

wherein each time the administrative console application is instructed to run the process of data validation, the console application displays the data metric values and differences between the source and target instances, as defined by the tables and columns selected for validation purposes.

14. The method of claim 10, wherein each customer or tenant of the environment is associated with their own customer tenancy within the data warehouse, that is associated with their own customer schema and is additionally provided with read-only access to the analytic applications schema.

15. The method of claim 10, wherein the metadata associated with the customer's data stored in the data warehouse instance includes one or more mapping from physical aliases to logical tables and logical table sources, and one or more logical table to subject area mappings.

16. The method of claim 10, wherein the semantic model extension process operates with:

a physical layer having details or metadata that maps to a physical data model;

a business model and mapping layer having details or metadata that operates as a logical mapping of the data;

wherein the semantic model extension process introspects the customer's source data at their data warehouse instance to:

determine, based upon the presentation layer, business model and mapping, and physical layer details or metadata, the custom facts, custom dimensions, or extensions associated with the customer's data; and generate a corresponding payload describing the customizations or extensions to the customer's data source model;

for use by the customization service in modifying the semantic model so as to extend or otherwise customize the semantic model, for use with the customer's data.

17. The method of claim 16, wherein the physical layer details or metadata include one or more table or dimension aliases or primary keys;

wherein the business model and mapping layer details or metadata include a mapping from physical aliases to logical tables;

wherein the presentation layer includes a logical table to subject area mapping.

18. A non-transitory computer readable storage medium having instructions thereon, which when read and executed by a computer including one or more processors cause the computer to perform a method comprising:

providing, by the computer, an analytic applications environment that that provides access to a data warehouse for storage of data received from an enterprise software application or data environment, wherein the data warehouse includes:

an analytic applications schema, and for each customer of a plurality of customers, a customer schema that is used to supplement and utilize the customer's data within their own data warehouse instance;

performing, by the computer, a process at intervals to extract the data from a customer's enterprise software application or data environment, and transform the extracted data into a model format to be loaded into the customer schema of their data warehouse instance;

providing, by the computer, a semantic model for use with the data that enables surfacing of data analytics or other business intelligence data at a presentation layer, including wherein the semantic model includes a metadata that defines one or more schemas, mappings, table navigation, or other constructs that implement the semantic model;

performing, by the computer, a semantic model extension process that:

introspects the customer's data stored in the data warehouse instance, including importing one or more source table and columns, evaluates the metadata associated with the one or more source table and columns to determine custom facts, custom dimensions, or extensions associated with the customer's data, and generates a payload descriptive of such customizations or extensions, wherein the payload is provided to a customization service and information provided therein is used by the customization service in performing a process or workflow and corresponding operations to modify the semantic model so as to extend or otherwise customize the semantic model, for use with the customer's data; and providing a user interface by which customers can validate their data as stored in their data warehouse instance with an original source data, as provided by a source system, including an application of the custom facts, custom dimensions, or extensions, associated with the customer's data; and wherein the system displays actual data and differences between the data warehouse instance and the original source data.

19. The non-transitory computer readable storage medium of claim 18, further comprising an interactive tool and user interface that enables a user to manage the contents of the semantic model;

wherein during introspection by the semantic model extension process of a customer's source data, the computer determines, based upon presentation layer, business model and mapping, and physical layer details or metadata, configurable by the interactive tool, the custom facts, custom dimensions, or extensions, associated with the customer's data.

20. The non-transitory computer readable storage medium of claim 18, wherein the semantic model extension process generates a payload describing the customizations or extensions to the customer's data source model, wherein the payload is provided to the customization service adapted to receive an indication of custom facts, custom dimensions, or other customizations or extensions associated with the data source model, and update the semantic model accordingly.

* * * * *